United States Patent
Inoue

(10) Patent No.: US 10,505,626 B2
(45) Date of Patent: Dec. 10, 2019

(54) COMMUNICATION APPARATUS, COMMUNICATION METHOD, AND COMMUNICATION SYSTEM

(71) Applicant: NEC CORPORATION, Tokyo (JP)

(72) Inventor: Takanori Inoue, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/735,834

(22) PCT Filed: Jun. 20, 2016

(86) PCT No.: PCT/JP2016/002960
§ 371 (c)(1),
(2) Date: Dec. 12, 2017

(87) PCT Pub. No.: WO2017/002322
PCT Pub. Date: Jan. 5, 2017

(65) Prior Publication Data
US 2018/0167139 A1    Jun. 14, 2018

(30) Foreign Application Priority Data
Jun. 30, 2015    (JP) .................................. 2015-130803

(51) Int. Cl.
*H04B 10/079*    (2013.01)
*H04J 14/00*    (2006.01)
(Continued)

(52) U.S. Cl.
CPC ..... *H04B 10/07953* (2013.01); *H04B 10/079* (2013.01); *H04J 14/00* (2013.01);
(Continued)

(58) Field of Classification Search
CPC .. H04B 10/07953; H04B 10/291; H04J 14/02
See application file for complete search history.

(56) References Cited

U.S. PATENT DOCUMENTS 8,073,325 B2    12/2011    Goto
8,873,950 B2    10/2014    Akasaka
(Continued)

FOREIGN PATENT DOCUMENTS

CN    1527524 A    9/2004
CN    103973364 A    8/2014
(Continued)

OTHER PUBLICATIONS

Written Opinion for PCT/JP2016/002960, dated Aug. 16, 2016.
(Continued)

*Primary Examiner* — Dzung D Tran
(74) *Attorney, Agent, or Firm* — Sughrue Mion, PLLC

(57) ABSTRACT

A communication apparatus including: an optical multiplexer that is configured to receive one or more optical signals for transmitting data, and generate a wavelength multiplexed signal that is an optical signal obtained by multiplexing the one or more optical signals; a first conversion signal generator that is configured to select a signal of a first wavelength from the wavelength multiplexed signal generated by the optical multiplexer, and to generate a conversion signal by converting the signal of a first wavelength being selected into a signal of a second wavelength; and a first signal selector that is configured to receive the wavelength multiplexed signal generated and the conversion signal, and to select and output at least one of a signal included in the wavelength multiplexed signal and the conversion signal, for each wavelength of a signal included in the wavelength multiplexed signal and the conversion signal.

7 Claims, 14 Drawing Sheets

(51) Int. Cl.
*H04J 14/02* (2006.01)
*H04B 10/291* (2013.01)
*H04Q 11/00* (2006.01)

(52) U.S. Cl.
CPC ............ *H04J 14/02* (2013.01); *H04B 10/291* (2013.01); *H04Q 2011/0084* (2013.01)

(56) References Cited

U.S. PATENT DOCUMENTS

| | | | |
|---|---|---|---|
| 2002/0097460 A1 | 7/2002 | Ikoma et al. | |
| 2004/0096216 A1 | 5/2004 | Ito | |
| 2006/0222366 A1 | 10/2006 | Sugaya | |
| 2009/0129770 A1* | 5/2009 | Oohashi | H04B 10/07955 398/1 |
| 2011/0085803 A1* | 4/2011 | Ji | H04J 4/0204 398/79 |
| 2013/0084064 A1* | 4/2013 | Akasaka | H04B 10/0795 398/34 |
| 2014/0241719 A1* | 8/2014 | Sone | H04J 14/0202 398/48 |

FOREIGN PATENT DOCUMENTS

| | | |
|---|---|---|
| JP | 10-210008 A | 8/1998 |
| JP | 11-298418 A | 10/1999 |
| JP | 2000-115132 A | 4/2000 |
| JP | 2000-151514 A | 5/2000 |
| JP | 2004-172783 A | 6/2004 |
| JP | 2008-085883 A | 4/2008 |
| JP | 2008-218705 A | 9/2008 |
| JP | 2010-147674 A | 7/2010 |
| JP | 2013-081168 A | 5/2013 |
| JP | 2013-183371 A | 9/2013 |

OTHER PUBLICATIONS

International Search Report for PCT/JP2016/002960, dated Aug. 16, 2016.
Communication dated Feb. 12, 2019 from Japanese Patent Office in counterpart JP Application No. 2017-526163.
Communication dated Feb. 11, 2019 from European Patent Office in counterpart EP Application No. 16817434.0.
Communication dated Jul. 1, 2019, from the State Intellectual Property Office of the P.R.C. in application No. 201680038679.0.

* cited by examiner

COMMUNICATION APPARATUS, COMMUNICATION METHOD, AND COMMUNICATION SYSTEM

CROSS REFERENCE TO RELATED APPLICATIONS

This application is a National Stage of International Application No. PCT/JP2016/002960 filed Jun. 20, 2016, claiming priority based on Japanese Patent Application No. 2015-130803 filed Jun. 30, 2015, the contents of all of which are incorporated herein by reference in their entirety.

TECHNICAL FIELD

The present invention relates to a technology of measuring an optical signal to noise ratio in an optical communication network for transmitting and receiving a wavelength multiplexed signal.

BACKGROUND ART

In recent years, an optical communication system employing a wavelength division multiplex method is widely adopted according to a demand of increasing a capacity of communication data and increasing a communication speed. In the following, a communication system employing the method may be referred to as a "wavelength multiplex system", and an optical signal to be transmitted and received by the method may be referred to as a "wavelength multiplexed signal".

In the optical communication system, measuring an Optical Signal to Noise Ratio (OSNR) which is one of indexes representing transmission path characteristic of a communication path in operation is important from an aspect of maintaining and managing communication quality.

Regarding such optical communication system, for example, the following techniques are disclosed. PTL 1 discloses a technique of verifying transmission quality of a new route to be set in an optical transmission network. The technique disclosed in PTL 1 extracts a transmission parameter representing transmission characteristics of a new route, based on a result of transmitting and receiving a test signal by using the new route, and verifies transmission quality, based on the transmission parameter.

PTL 2 discloses a technique of measuring an OSNR of a channel for OSNR measurement by lowering a bit rate of an optical signal of the channel. The technique narrows a spectral width of an optical signal by lowering a bit rate of an optical signal of a channel to be measured, and measures a noise component of the channel to be measured in a state that an influence due to an adjacent channel is reduced.

PTL 3 discloses a technique of measuring (estimating) an OSNR without using a power monitor for measuring a signal intensity of each channel in an optical repeater constituting an optical transmission network. The technique disclosed in PTL 3 calculates a gain tilt of each channel in an optical repeater from a total optical power of the optical repeater, and obtains the OSNR of each channel in the optical repeater by using the gain tilt.

CITATION LIST

Patent Literature

[PTL 1] Japanese Laid-open Patent Publication No. 2004-172783

[PTL 2] Japanese Laid-open Patent Publication No. 2008-085883

[PTL 3] Japanese Laid-open Patent Publication No. 2008-218705

SUMMARY OF INVENTION

Technical Problem

To measure an OSNR, for example, it is necessary to measure a signal level and a noise level of an optical modulation signal (optical signal), in which traffic data are overlapped. However, in a wavelength multiplex system in which optical modulation signals are multiplexed with a high density, for example, as illustrated in FIG. 2, bottoms of signal spectra of adjacent signals may overlap each other. Therefore, there is a problem that it is difficult to accurately observe a noise level.

On the other hand, when the technique disclosed in PTL1 is applied to an optical communication system in an actual operational state, it is necessary to stop a communication signal in order to flow a test signal. Specifically, in this case, continuous traffic disconnection (blocking of traffic) may occur. Further, the technique disclosed in PTL 2 lowers a capacity of traffic (amount of transmittable/receivable data), since a bit rate of a modulation signal is temporarily lowered. This may generate continuous traffic disconnection during measurement of an OSNR. Further, it may be difficult to observe a noise level even when a bit rate of a modulation signal is lowered, since a signal interval is extremely narrow (for example, 33 GHz) in a hyper dense wavelength multiplex system used nowadays. The technique disclosed in PTL 3 is a technique of estimating an OSNR, based on a premise that gain tilts of respective optical repeaters are equal to each other, and is not a technique capable of directly solving the aforementioned problem. The technique disclosed in PTL 3 does not sufficiently consider characteristics of individual repeaters (for example, an individual difference between product lots, aging deterioration, or the like). Therefore, it is difficult to accurately calculate an OSNR of an optical transmission path in operation only by the technique. Specifically, when these associated techniques are used, an influence due to communication disconnection, lowering of a communication speed (communication band), or the like may occur when the OSNR is measured in the optical communication system in operation.

The present invention is made in view of the aforementioned circumstances. One of main objects of the present invention is to provide a communication apparatus and the like, which enable to measure an optical signal to noise ratio, while reducing an influence on a communication environment, in an optical communication system of transmitting and receiving a wavelength multiplexed signal.

Solution to Problem

To achieve the objective, a communication apparatus according to one aspect of the present invention includes: optical multiplexing means for receiving one or more optical signals capable of transmitting data, and generating a wavelength multiplexed signal that is an optical signal obtained by multiplexing the one or more optical signals; first conversion signal generation means for generating a conversion signal that is an optical signal converted from a signal of a first wavelength being selected from the wavelength multiplexed signal generated by the optical multiplexing means, into a signal of a second wavelength; and first signal selection means for receiving the wavelength multiplexed signal generated and the conversion signal, and selecting and outputting at least one of a signal included in the wavelength multiplexed signal and the conversion signal, for each wavelength of a signal included in the wavelength multiplexed signal and the conversion signal.

A communication apparatus according to another aspect of the present invention includes: measurement means capable of receiving, from an optical communication path, a wavelength multiplexed signal obtained by multiplexing one or more optical signals, and measuring at least one of a noise level and a signal level of a signal of a third wavelength in the wavelength multiplexed signal; second conversion signal generation means for generating a restored signal being an optical signal of a third wave length, by selecting a signal of a fourth wavelength from the wavelength multiplexed signal and converting the selected signal into the optical signal of the third wavelength; second signal selection means for receiving the wavelength multiplexed signal and the restored signal, and selecting at least one of the restored signal and an optical signal included in the wavelength multiplexed signal, for each wavelength of an optical signal included in the wavelength multiplexed signal and the restored signal; and optical demultiplexing means for demultiplexing an optical signal selected by the second signal selection means, based on a wavelength of a signal included in the optical signal.

A communication method according to one aspect of the present invention includes: receiving one or more optical signals, and generating a wavelength multiplexed signal that is an optical signal obtained by multiplexing the one or more optical signals; generating a conversion signal that is an optical signal converted from a signal of a first wavelength being selected from the wavelength multiplexed signal generated by the optical multiplexing means, into a signal of a second wavelength; and selecting and outputting at least one of a signal included in the wavelength multiplexed signal and the conversion signal, for each wavelength of a signal included in the wavelength multiplexed signal generated and the conversion signal.

A communication method according to another aspect of the present invention includes: receiving, from an optical communication path, a wavelength multiplexed signal obtained by multiplexing one or more optical signals, measuring at least one of a noise level and a signal level of a signal of a third wavelength, in the wavelength multiplexed signal; generating a restored signal being an optical signal of a third wave length, by selecting a signal of a fourth wavelength from the wavelength multiplexed signal and converting the selected signal into the optical signal of the third wavelength; and selecting at least one of the restored signal and an optical signal included in the wavelength multiplexed signal, for each wavelength of an optical signal included in the wavelength multiplexed signal and the restored signal, and demultiplexing the selected optical signal, based on a wavelength of a signal included in the optical signal.

Further, the aforementioned object is also accomplished by a communication system implemented by using the communication apparatus or the communication method having the aforementioned configuration.

Advantageous Effects of Invention

According to the present invention, it is possible to measure an optical signal to noise ratio, while reducing an influence on a communication environment, in an optical communication system capable of transmitting and receiving a wavelength multiplexed signal.

DESCRIPTION OF EMBODIMENTS

First, a summary of the present invention is described. As described above, in an optical communication system, measuring an OSNR is important from an aspect of maintaining communication quality in a communication path, or in early detection of a problem which may occur in a transmission path.

Figure 3:
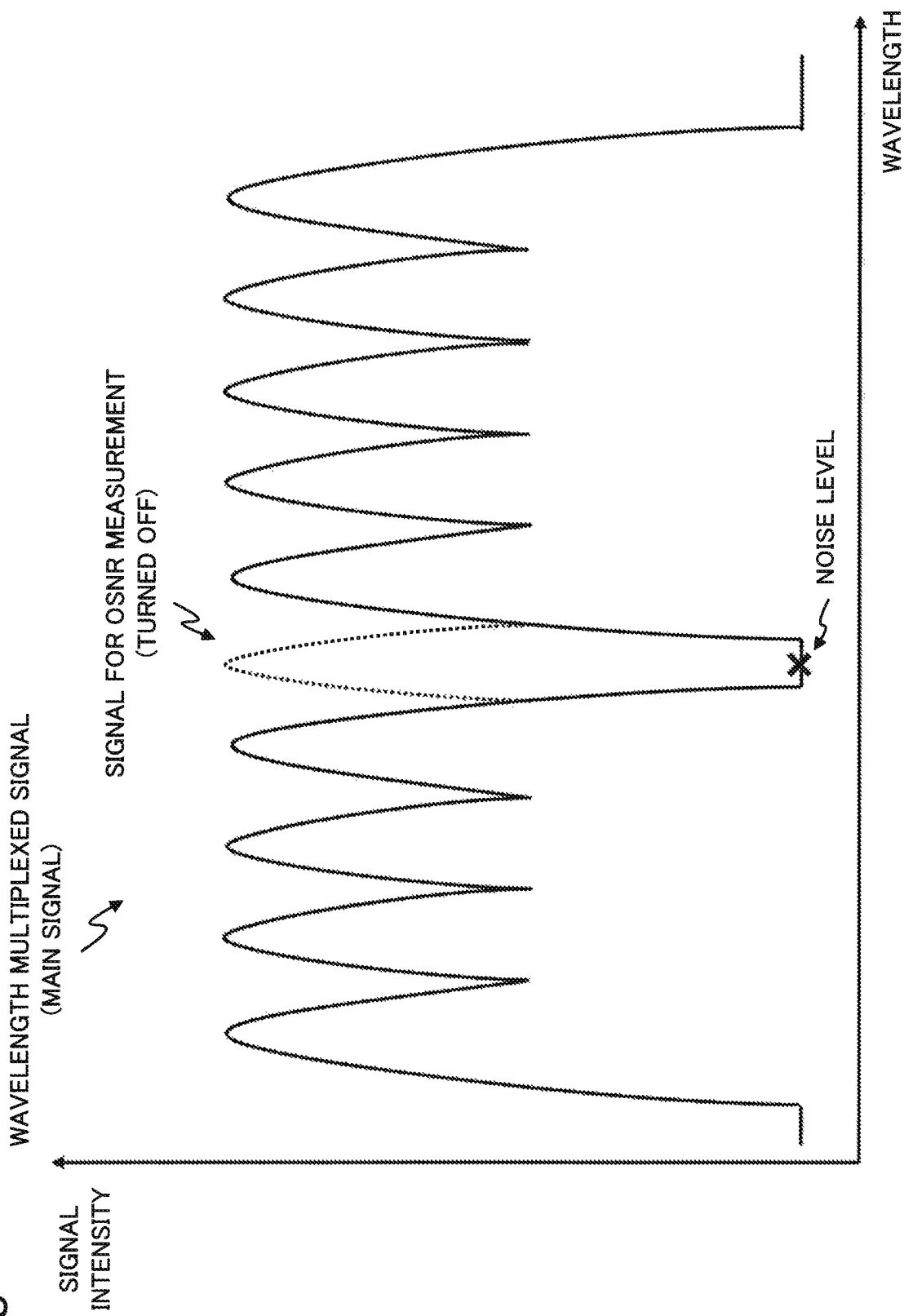
FIG. 3 is an explanatory diagram schematically illustrating a noise level when a signal of a wavelength for OSNR measurement is blocked (turned off) in association with each of example embodiments of the present invention.

To measure an OSNR in an optical communication system, it is required to measure a noise level and a signal level at a wavelength of a modulation signal (optical signal) for measurement. For example, as a simple method for measuring an OSNR, there is a method of calculating an OSNR by using both a noise level measured in a state that a modulation signal for measurement is temporarily turned off (OFF) (for example, a state exemplified in FIG. 3) and a signal level measured in a state that a modulation signal is turned on (ON). However, when this method is used, continuous traffic disconnection occurs during a period, from a wavelength multiplex system turning off an optical signal and measuring a noise level until the wavelength multiplex system turning on the optical signal again.

On the other hand, a technique described by using the following example embodiments regarding the present invention prepares another modulation signal (bypass signal) which is able to transmit traffic data to be superimposed on a modulation signal for OSNR measurement, by bypassing the modulation signal. Continuous traffic disconnection does not occur even while measuring an OSNR, since the traffic data are transmitted by using the bypass signal. Therefore, according to a technique relating to the present invention, which is described by using the following example embodiments, it is possible to efficiently measure an OSNR in all wavelength bands, while reducing a traffic disconnection (blocking) time in an optical communication system. Note that configurations described in the following example embodiments are specific examples, and the technical range of the present invention is not limited to these configurations.

First Example Embodiment

Figure 1:
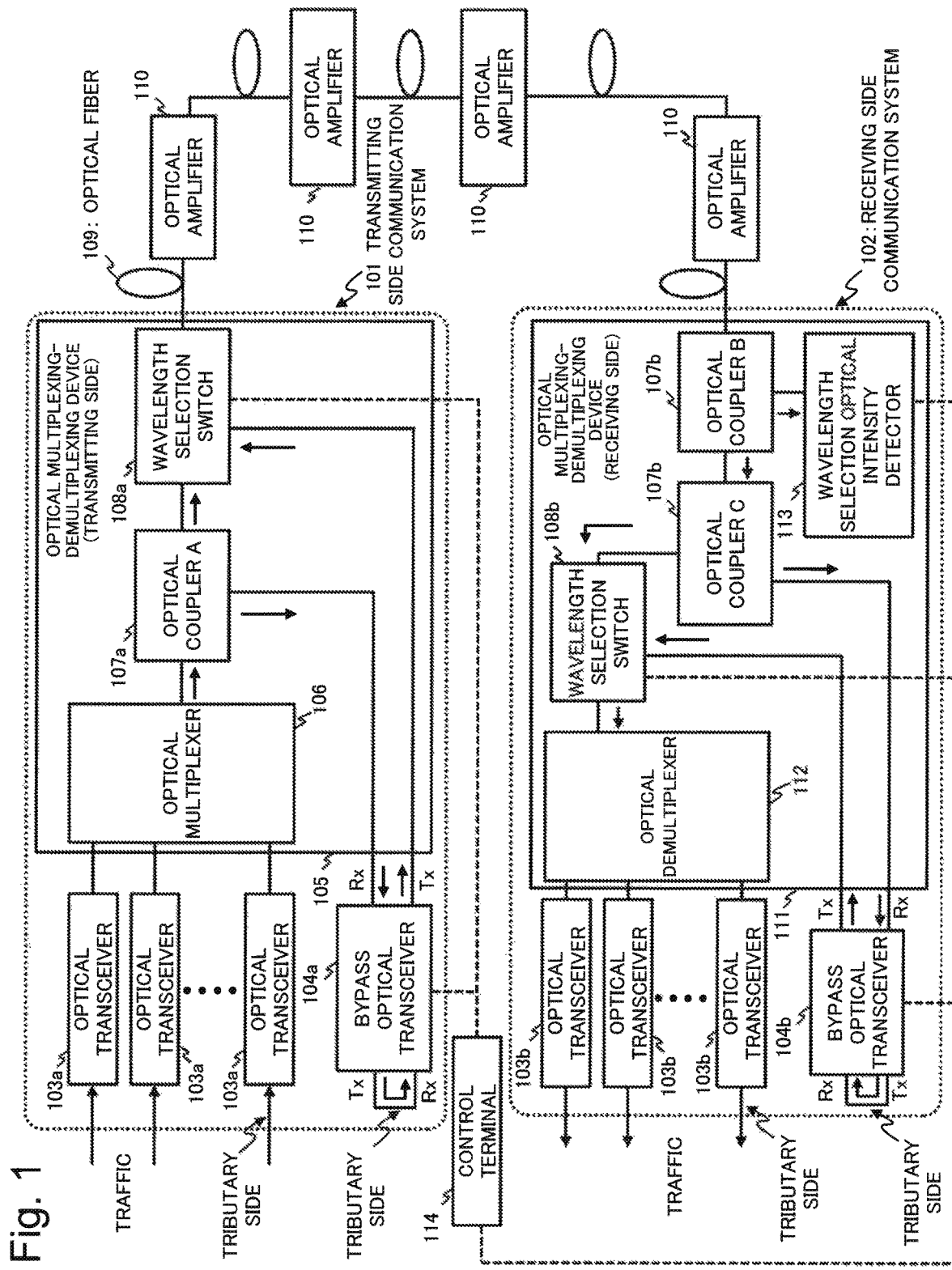
FIG. 1 is a block diagram exemplifying a functional configuration of constituent elements constituting a communication system in a first example embodiment of the present invention.
Figure 2:
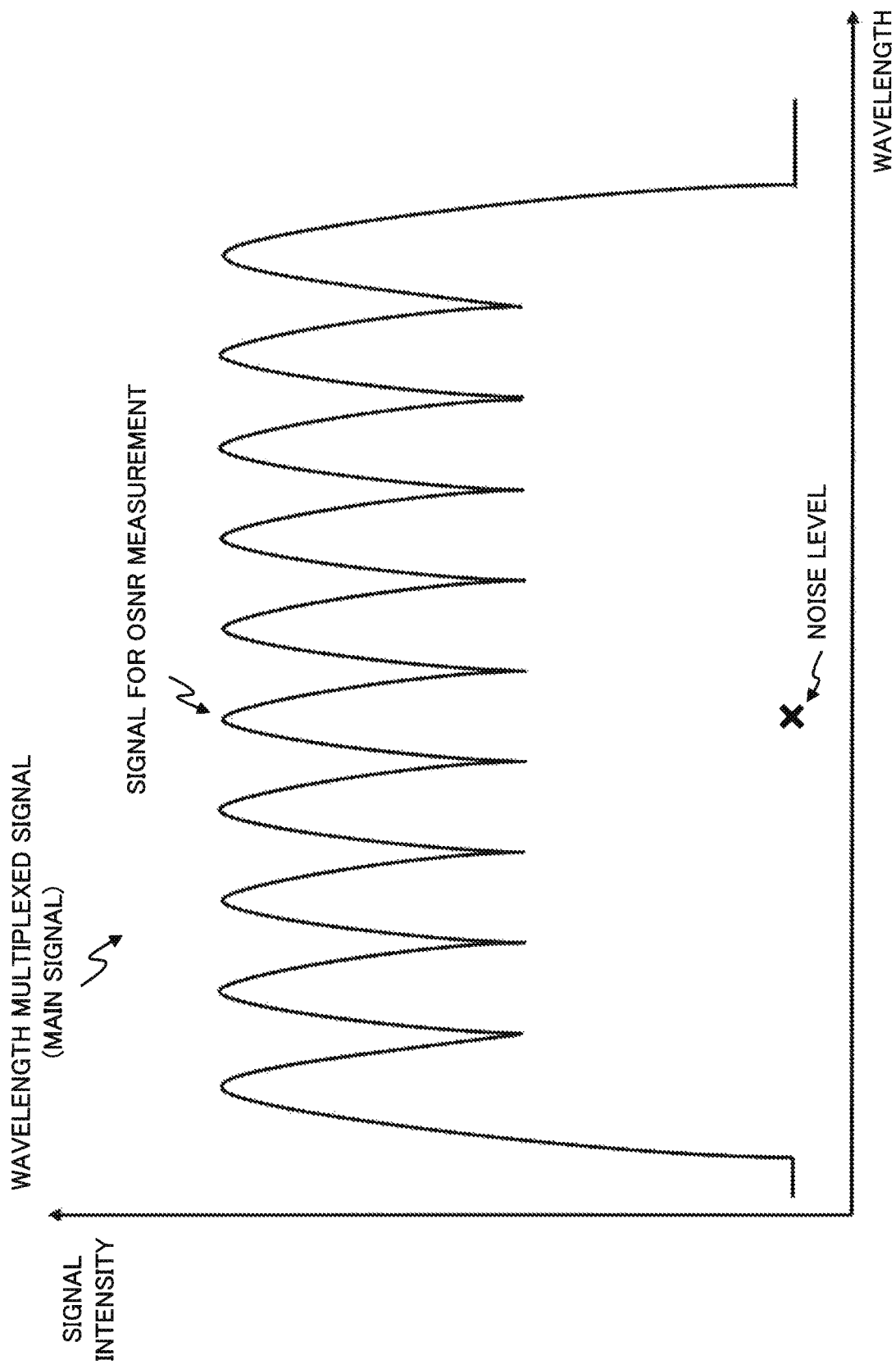
FIG. 2 is an explanatory diagram schematically illustrating a wavelength multiplexed signal to be transmitted and received via an optical communication line (transmission path) in the first example embodiment of the present invention.

[Configuration]
In the following, the first example embodiment of the present invention is described with reference to the drawings. FIG. 1 is a block diagram exemplifying a functional configuration of a communication system (a transmitting side communication system 101 and a receiving side communication system 102) constituting a communication system according to the first example embodiment of the present invention.

In the following, an optical transceiver 103a and an optical transceiver 103b may have a same configuration or a same function. The optical transceiver 103a and the optical transceiver 103b may be generically and simply referred to as an "optical transceiver 103". Likewise, a bypass optical transceiver 104a and a bypass optical transceiver 104b may have a same configuration or a same function. The bypass optical transceiver 104a and the bypass optical transceiver 104b may be generically and simply referred to as a "bypass optical transceiver 104". Likewise, an optical coupler 107a and an optical coupler 107b may have a same configuration or a same function. The optical coupler 107a and the optical coupler 107b may be generically and simply referred to as an "optical coupler 107". Likewise, a wavelength selection switch 108a and a wavelength selection switch 108b may have a same configuration or a same function. The wavelength selection switch 108a and the wavelength selection switch 108b may be generically and simply referred to as a "wavelength selection switch 108".

Further, optical multiplexing-demultiplexing devices (hereinafter, referred to as "optical multiplexing-demultiplexing devices") 105 and 111 in FIG. 1 may function as a transmitting device or a receiving device by providing same configurations, respectively. In FIG. 1, for convenience of explanation, a configuration of the optical multiplexing-demultiplexing device 105 which functions as a transmitting device is illustrated. Likewise, in FIG. 1, a configuration of the optical multiplexing-demultiplexing device 111 which functions as a receiving device is illustrated.

One or more optical transceivers 103a are connected to the transmitting side communication system 101. Each of the optical transceivers 103a connected to the transmitting side communication system 101 is communicatively connected to the optical multiplexing-demultiplexing device 105 to be described later. The transmitting side communication system 101 and the optical multiplexing-demultiplexing device 105 may be communicatively connected by an optical circuit device such as an optical fiber, for example.

The optical transceiver 103a receives, for example, traffic data (for example, communication data from a tributary side), and generates an optical signal in which the traffic data are superimposed, and which is transmittable in an optical path. The optical transceiver 103a outputs a generated optical signal to the optical multiplexing-demultiplexing device 105 (to be described later).

Each of the optical transceivers 103a may receive, for example, traffic data transmitted by an electrical signal, or may receive traffic data transmitted by an optical signal. Specifically, the optical transceiver 103a may function, for example, as an interface between two networks (for example, a communication network installed on land, and a communication network embedded in the sea). In this case, each of the optical transceivers 103a may convert (for example, convert into frame) traffic data received from one of the communication networks (for example, the communication network on land) into a format in which data are transmittable and receivable in the other communication network (for example, the communication network in the sea).

The optical transceiver 103a is able to change a wavelength of an optical signal to be generated as necessary, based on setting, a control signal, or the like, for example. This allows each of the optical transceivers 103a connected to the transmitting side communication system 101 to generate an optical signal of a different wavelength.

As will be described later, the optical transceiver 103a (optical transceiver 103b) may convert the data into an appropriate format, and may output the converted data to a tributary side, when an optical signal is received from the optical multiplexing-demultiplexing device 105. In this case, the optical transceiver 103a may receive, from the optical multiplexing-demultiplexing device 105, an optical signal of a specific wavelength selected based on setting, a control signal, or the like.

Next, the optical multiplexing-demultiplexing device 105 and the bypass optical transceiver 104a in the transmitting side communication system 101 are described. As exemplified in FIG. 1, the optical multiplexing-demultiplexing device 105 includes an optical multiplexer 106, the optical coupler 107a, and the wavelength selection switch 108a. These constituent elements constituting the optical multiplexing-demultiplexing device 105 are connected by using an optical circuit device such as an optical fiber.

The optical multiplexer 106 receives one or more optical signals, and outputs an optical signal obtained by multiplexing these optical signals. Specifically, the optical multiplexer 106 receives, for example, an optical signal of a different wavelength from each of one or more optical transceivers 103a, and generates a main signal (wavelength multiplexed signal), a wavelength of which is multiplexed. The optical multiplexer 106 outputs the wavelength multiplexed signal being generated to the optical coupler 107a (optical coupler A) to be described later. The optical multiplexer 106 is implementable by using, for example, a prism employing a micro-optics technique, a diffraction grating, a thin film filter, an arrayed waveguide grating (AWG), or the like.

The optical coupler 107a splits an input optical signal (wavelength multiplexed signal) into two or more transmission paths, and outputs split optical signals. Specifically, the optical coupler 107a splits a wavelength multiplexed signal received from the optical multiplexer 106 into the wavelength selection switch 108a and the bypass optical transceiver 104a to be described later, and outputs split signals. The optical coupler 107a may be, for example, a melt-drawn coupler obtained by processing an optical fiber, or a waveguide coupler obtained by forming an optical waveguide on a circuit board. Further, the optical coupler 107a may be implemented, for example, by using a very small half mirror.

The bypass optical transceiver 104a is connected to the optical multiplexing-demultiplexing device 105, converts a wavelength of a specific signal in a wavelength multiplexed signal received by the optical multiplexing-demultiplexing device 105, and outputs a signal of the converted wavelength to the optical multiplexing-demultiplexing device 105 by folding back. Specifically, the bypass optical transceiver 104a receives a signal of a specific wavelength, out of a wavelength multiplexed signal, based on setting, a control signal, or the like. Further, the bypass optical transceiver 104a outputs, to the optical multiplexing-demultiplexing device 105, an optical signal of a wavelength selected based on setting, a control signal, or the like. Further, the bypass optical transceiver 104a is able to convert an optical signal received from the optical multiplexing-demultiplexing device 105, and output the converted optical signal to a tributary side.

A wavelength multiplexed signal split by the optical coupler 107a of the optical multiplexing-demultiplexing device 105 is input to a receiving port Rx (port connected to the optical multiplexing-demultiplexing device 105) on a line side of the bypass optical transceiver 104a. The bypass optical transceiver 104a includes a light emitting device capable of emitting local light, and is able to receive a specific optical signal of a wavelength same as that of the local light. The wavelength of the local light is variable, and the bypass optical transceiver 104a is able to receive an optical signal of any wavelength. This enables the bypass optical transceiver 104a to select and receive a signal of a wavelength for OSNR measurement (hereinafter, also referred to a "wavelength for measurement"), in a wavelength multiplexed signal in response to a control signal from a control terminal 114 to be described later. For example, when a wavelength multiplexed signal includes signals of "n" wavelengths ($\lambda 1$ to $\lambda n$) (where "n" is a natural number of 1 or larger), the bypass optical transceiver 104a receives a signal of a wavelength for measurement (wavelength is assumed to be $\lambda k$), out of the wavelength multiplexed signal. The wavelength $\lambda k$ for measurement may be any wavelength out of n wavelengths from $\lambda 1$ to $\lambda n$. Note that the aforementioned light emitting device may be, for example, the same as a local light emitting device provided in a well-known coherent receiver.

A transmitting port Tx and a receiving port Rx on a tributary side of the bypass optical transceiver 104a are connected by folding back. Specifically, the bypass optical transceiver 104a outputs an output signal generated based on a received optical signal of a wavelength for measurement to the transmitting port Tx on a tributary side. In this case, the bypass optical transceiver 104a may convert an optical signal of a wavelength for measurement into an appropriate format, as necessary.

The transmitting port Tx on a tributary side is connected to the receiving port Rx on a tributary side. Therefore, an output signal output to the transmitting port Tx on a tributary side is output to the bypass optical transceiver 104a as is. The bypass optical transceiver 104a outputs a signal input to the receiving port Rx on a tributary side, to the wavelength selection switch 108a. Note that the bypass optical transceiver 104a may output a signal input to the receiving port Rx on a tributary side to the wavelength selection switch 108a after conversion into an appropriate format. In this case, the bypass optical transceiver 104a selects a wavelength (hereinafter, also referred to as a "bypass wavelength") of an optical signal to be output, based on setting or a control signal from the control terminal 114. Further, the bypass optical transceiver 104a outputs the optical signal to the optical multiplexing-demultiplexing device 105.

By the aforementioned function, the bypass optical transceiver 104a is able to output a signal received from the optical multiplexing-demultiplexing device 105 to the optical multiplexing-demultiplexing device 105 by converting a wavelength of the signal. That is, the bypass optical transceiver 104a is able to receive a signal of a wavelength $\lambda k$ for measurement from the optical multiplexing-demultiplexing device 105, and output the signal to the optical multiplexing-demultiplexing device 105 by converting a wavelength of the optical signal into a bypass wavelength (wavelength is assumed to be $\lambda d$). In the following, an optical signal of a bypass wavelength $\lambda d$ output from the bypass optical transceiver 104a to the optical multiplexing-demultiplexing device 105 may be referred to as a bypass signal.

A bypass wavelength $\lambda d$ is a wavelength, which is not included in a wavelength band of the aforementioned main signal. When a bypass wavelength $\lambda d$ is set in a band different from a band of the main signal, for example, a bypass signal and the main signal may not interfere with each other. Specifically, a bypass wavelength $\lambda d$ may assigned, for example, in a band allocated for use in monitoring a transmission path, which is a band different from a band of the main signal. Generally, the monitoring band is not used frequently, and therefore, it is possible to use the monitoring band as a bypass wavelength. A bypass wavelength $\lambda d$ is not limited to a band for use in monitoring a transmission path, and may be included in any other wavelength band, which is different from a band of the main signal.

Note that the bypass optical transceiver 104a and the optical transceiver 103a are capable of setting a wavelength of an optical signal to be received, and a wavelength of an optical signal to be output, respectively, based on setting, a control signal, or the like. Therefore, the bypass optical transceiver 104a and the optical transceiver 103a may be implemented as a device having the same configuration. In this case, for example, it is possible to use a certain optical transceiver 103a as the bypass optical transceiver 104a by connecting a transmitting port Tx on a tributary side of the certain optical transceiver 103a to a receiving port Rx by folding back.

The wavelength selection switch 108a is able to receive one or more optical signals, and select a signal to be output (transmitted) among the received signals for each wavelength. As exemplified in FIG. 1, the wavelength selection switch 108a in the present example embodiment receives, from two input ports, two optical signals, one of which is a wavelength multiplexed signal output from the optical coupler 107a, and the other of which is a bypass signal output from the bypass optical transceiver 104a.

The wavelength selection switch 108a is able to select which one of two optical signals is transmitted, for example, based on a control signal from the control terminal 114 or setting, for each wavelength of an optical signal. Specifically, the wavelength selection switch 108a is able to transmit, for example, a signal of a wavelength other than a wavelength λk for measurement, among a wavelength multiplexed signal input from the optical coupler 107a. Further, the wavelength selection switch 108a is able to transmit, for example, a bypass signal (bypass wavelength λd) output from the bypass optical transceiver 104a. T, the wavelength selection switch 108a is able to block a signal of a wavelength λk for measurement among an input wavelength multiplexed signal, and transmit a signal of a bypass wavelength λd. As the wavelength selection switch 108a, for example, a Wavelength Selective Switch (WSS) or the like employing a Liquid Crystal On Silicon (LCOS) device is known.

Figure 4:
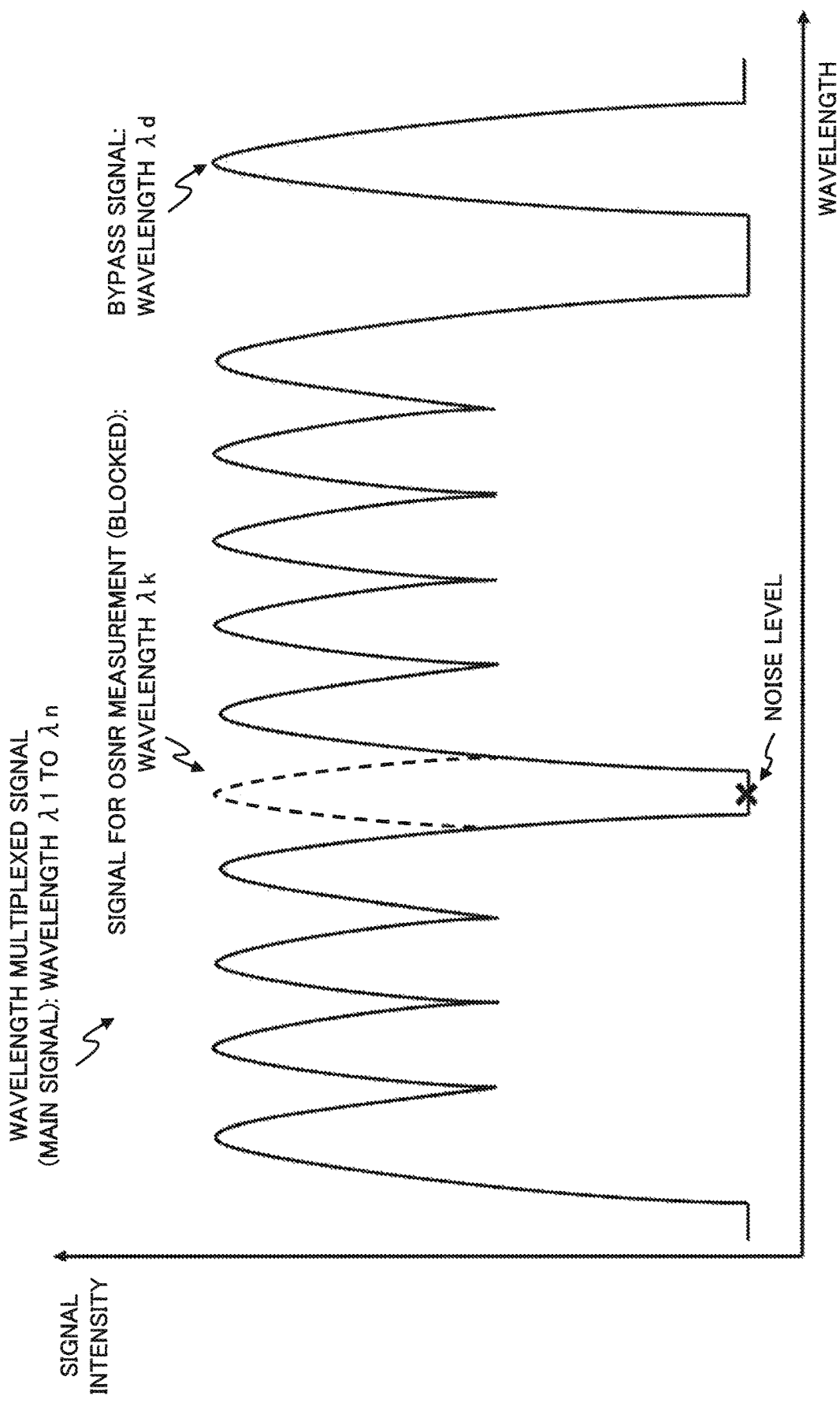
FIG. 4 is an explanatory diagram schematically illustrating a wavelength multiplexed signal when a signal of a wavelength for OSNR measurement is converted into a signal of a bypass wavelength in association with the first example embodiment of the present invention.

FIG. 4 is an explanatory diagram schematically illustrating a wavelength multiplexed signal to be transmitted from the wavelength selection switch 108a to a transmission path (to be described later). As exemplified in FIG. 4, traffic data which are superimposed on an optical signal of a wavelength λk for OSNR measurement is transmitted by the transmitting side communication system 101 configured as described above, with use of an optical signal of a bypass wavelength λd. Consequently, a wavelength λk for measurement is brought to a no signal state. This allows the optical multiplexing-demultiplexing device 111 on a receiving side to be described later to measure a noise level of a wavelength λk for measurement in a transmission path.

Next, an optical communication transmission path in the present example embodiment is described. A transmission path is constituted by a plurality of transmission path fibers (optical fibers) 109, and a plurality of optical amplifiers 110. For example, when an undersea cable system is assumed, constituent elements of these transmission paths are embedded in a sea bottom. Therefore, it is difficult to know a change in characteristics including aging deterioration or the like in an actual operational state regarding these constituent elements. Note that the optical fibers 109 and the optical amplifiers 110 are respectively implementable by using well-known techniques, and therefore, detailed description thereof is omitted.

Next, the receiving side communication system 102 is described. The receiving side communication system 102 is connected to one or more optical transceivers 103b. The optical transceiver 103b may have a same configuration and a same function as the aforementioned optical transceiver 103a. The optical transceiver 103b accepts (receives), for example, an optical signal from the optical multiplexing-demultiplexing device 111 (to be described later). More specifically, the optical transceiver 103b receives an optical signal of a specific wavelength, which is demultiplexed by an optical demultiplexer 112 in the optical multiplexing-demultiplexing device 111. The optical transceiver 103b outputs a received optical signal to a tributary side as traffic data.

Next, the optical multiplexing-demultiplexing device 111 and the bypass optical transceiver 104b in the receiving side communication system 102 are described. As exemplified in FIG. 1, the optical multiplexing-demultiplexing device 111 includes the optical coupler 107b (an optical coupler B and an optical coupler C), the wavelength selection switch 108b, the optical demultiplexer 112, and a wavelength selection optical intensity detector 113.

In the optical multiplexing-demultiplexing device 111, a wavelength multiplexed signal received via a transmission path is split by the optical coupler 107b (optical coupler B) at an initial stage (a first stage) on a side of a transmission path. One of the split optical signals is transmitted to the wavelength selection optical intensity detector 113 (to be described later). The other of the spilt optical signals is transmitted to the optical coupler 107b (optical coupler C) at a later stage (second stage). The optical coupler 107b (optical coupler C) at the second stage splits a wavelength multiplexed signal received from the optical coupler B into the bypass optical transceiver 104b and the wavelength selection switch 108b. The optical coupler 107b is implementable by using the same technique as the optical coupler 107a.

The wavelength selection optical intensity detector 113 has a function of detecting an intensity of light (light intensity) of a specific wavelength. The wavelength selection optical intensity detector 113 detects a signal level when a signal (modulation signal for transmitting traffic data) is present in a wavelength to be detected. The wavelength selection optical intensity detector 113 detects a noise level when a signal is not present in a wavelength to be detected. In the present example embodiment, a wavelength for which a light intensity is detected is set in the wavelength selection optical intensity detector 113, for example, based on a control signal from the control terminal 114.

The wavelength selection optical intensity detector 113 may be constituted by using, for example, an optical variable filter and a light receiving element. In this case, for example, a specific wavelength is selected in the optical variable filter (specifically, only a specific wavelength is transmitted), and an intensity of light having the specific wavelength is detected by using the light receiving element (for example, a Photo Detector (PD) or the like).

The bypass optical transceiver 104b receives a signal of a specific wavelength (same wavelength as the wavelength of local light), among a wavelength multiplexed signal by using local light in the same manner as the aforementioned bypass optical transceiver 104a. More specifically, the bypass optical transceiver 104b receives an optical signal of a bypass wavelength λd (bypass signal) among a wavelength multiplexed signal received from the optical coupler C.

A transmitting port Tx and a receiving port Rx on a tributary side of the bypass optical transceiver 104b are connected by folding back in the same manner as the bypass optical transceiver 104a. The bypass optical transceiver 104b outputs an output signal generated based on a received optical signal to the transmitting port Tx on a tributary side in the same manner as the bypass optical transceiver 104a. The output signal is input to the receiving port Rx on a tributary side of the bypass optical transceiver 104b as is. The bypass optical transceiver 104b generates an optical signal based on a signal input to the receiving port Rx on a tributary side. In this case, a wavelength of an optical signal to be output from the bypass optical transceiver 104b is selected, based on setting or a control signal from the control terminal 114. In this case, λk is set as the wavelength. By the aforementioned function, the bypass optical transceiver 104b is able to receive an optical signal of a bypass wavelength λd from the optical multiplexing-demultiplexing device 111, convert the wavelength of the optical signal into a wavelength λk for measurement, and output a signal of the converted wavelength to the optical multiplexing-demultiplexing device 105. That is, the aforementioned configuration makes it possible to restore a bypass signal transmitted by using a bypass wavelength λd to a signal of an original wavelength λk for measurement.

The wavelength selection switch 108b receives one or more optical signals in the same manner as the aforementioned wavelength selection switch 108a. The wavelength selection switch 108b is able to select a signal to be transmitted, out of received signals for each wavelength. Specifically, as exemplified in FIG. 1, the wavelength selection switch 108b in the present example embodiment receives, from two input ports, two optical signals, one of which is a wavelength multiplexed signal output from the optical coupler 107b (optical coupler C), and the other of which is an optical signal (signal of a wavelength λk for measurement) output from the bypass optical transceiver 104b. The wavelength selection switch 108b is able to select a signal to be transmitted among two optical signals, based on a control signal from the control terminal 114 or setting, for each wavelength of an optical signal, for example.

The wavelength selection switch 108b transmits, for example, a signal other than a bypass wavelength λd among a wavelength multiplexed signal input from the optical coupler C. Further, the wavelength selection switch 108a transmits, for example, an optical signal (signal of a wavelength λk for measurement) output from the bypass optical transceiver 104b. Specifically, the wavelength selection switch 108b blocks a signal of a bypass wavelength λd among an input wavelength multiplexed signal, and transmits a signal of a wavelength λk for measurement. By this, a wavelength multiplexed signal being output from the wavelength selection switch 108b becomes similar to a signal equivalent to a wavelength multiplexed signal output from the optical multiplexer 106 to the optical coupler A.

The optical demultiplexer 112 receives a wavelength multiplexed signal output from the wavelength selection switch 108b as an input. The optical demultiplexer 112 demultiplexes a received wavelength multiplexed signal for each wavelength, and outputs demultiplexed signals to the respective optical transceivers 103b. For example, when signals of "n" wavelengths from λ1 to λn are included in a wavelength multiplexed signal, the optical demultiplexer 112 may demultiplex the wavelength multiplexed signal into "n" individual signals, and may output the respective signals to the optical transceivers 103b. The optical demultiplexer 112 may be implemented, for example, by using an interference film filter using a dielectric multilayer film, a diffraction grating, or the like.

Figure 5:
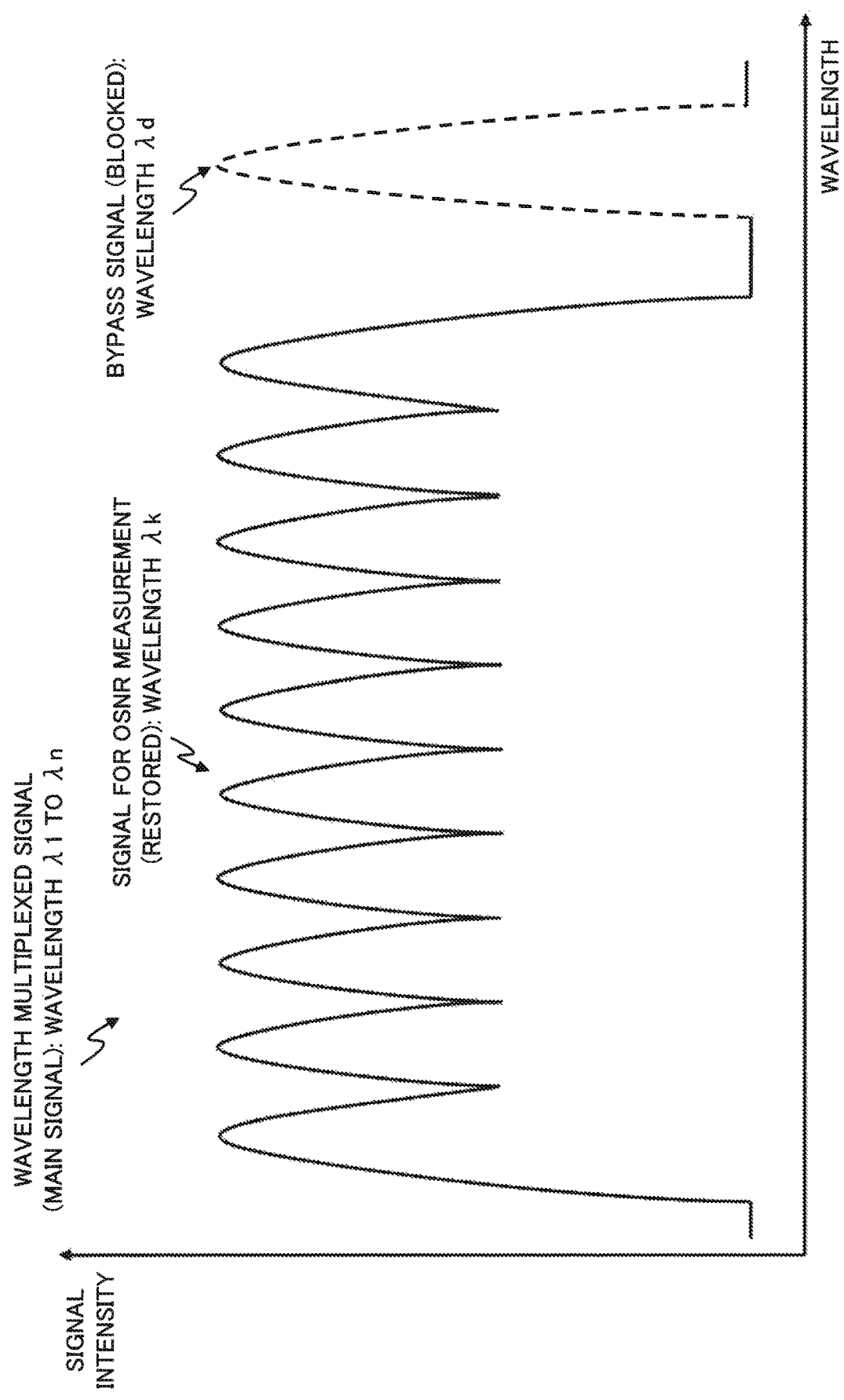
FIG. 5 is an explanatory diagram schematically illustrating a wavelength multiplexed signal when a signal of a bypass wavelength is converted into a signal of a wavelength for OSNR measurement in association with the first example embodiment of the present invention.

FIG. 5 is an explanatory diagram schematically illustrating a wavelength multiplexed signal to be output from the wavelength selection switch 108b. As exemplified in FIG. 5, traffic data transmitted by using an optical signal of a bypass wavelength λd are converted (restored) into an optical signal of an original wavelength (wavelength λk for measurement). This makes it possible to restore a wavelength multiplexed signal being output from the wavelength selection switch 108b to a signal equivalent to a wavelength multiplexed signal being output from the optical multiplexer 106. The wavelength multiplexed signal is demultiplexed by the optical demultiplexer 112 for each wavelength, and demultiplexed signals are output to the respective optical transceivers 103b. A signal which is converted into a bypass wavelength λd for OSNR measurement is converted into an original wavelength (wavelength λk for measurement) again. Therefore, each of the optical transceivers (103a and 103b) is able to execute communication without considering such wavelength conversion.

The control terminal 114 is connected to the bypass optical transceiver 104a and the wavelength selection switch 108a in the transmitting side communication system 101 by a control line. The control terminal 114 is connected to the bypass optical transceiver 104b, the wavelength selection switch 108b, and the wavelength selection optical intensity detector 113 in the receiving side communication system 102 by a control line. The control line is a communication line for control. The control line may be implemented by using a part of a transmission path of the optical signal, or may be implemented by using a communication line other than the transmission path. More specifically, the control line is implementable by using an order wire line, in which a channel is set to any channel in the aforementioned transmission path. Further, a control signal to be transmitted by the control terminal 114 may be included, for example, in an overhead area to be added to a frame for use in transmitting traffic data (user data) in a transmission path.

The control terminal 114 is able to control the bypass optical transceivers (104a and 104b), the wavelength selection switches (108a and 108b), and the wavelength selection optical intensity detector 113 via the control line. The control terminal 114 may transmit a control signal to each of the constituent elements, and may transmit setting information for use in setting each of the constituent elements.

Specifically, the control terminal 114 sets a wavelength of local light with respect to the bypass optical transceiver 104a. A wavelength of local light is set, for example, to a wavelength λk for measurement. The control terminal 114 sets a wavelength of an optical signal to be output from the bypass optical transceiver 104a. A wavelength of an optical signal to be output from the bypass optical transceiver 104a is set, for example, to a bypass wavelength λd.

Likewise, the control terminal 114 sets a wavelength of local light with respect to the bypass optical transceiver 104b. A wavelength of local light is set, for example, to a bypass wavelength λd. Further, the control terminal 114 may set a wavelength of an optical signal to be output from the bypass optical transceiver 104b. A wavelength of an optical signal to be output from the bypass optical transceiver 104b is set, for example, to a wavelength λk for measurement.

The control terminal 114 sets a wavelength of a signal to be transmitted through the wavelength selection switch 108a. The wavelength selection switch 108a is configured, for example, so as to transmit signal of a wavelength other than a wavelength λk for measurement among a wavelength multiplexed signal received from the optical coupler 107a (optical coupler A). Further, the wavelength selection switch 108a is configured, for example, so as to transmit a signal of a bypass wavelength λd received from the bypass optical transceiver 104a.

Likewise, the control terminal 114 sets a wavelength to be selected by the wavelength selection switch 108b. The wavelength selection switch 108b is configured, for example, so as to transmit a signal of a wavelength other than a bypass wavelength λd among a wavelength multiplexed signal received from the optical coupler 107b (optical coupler C). Further, the wavelength selection switch 108b is configured, for example, so as to transmit a signal of a wavelength λk for measurement, which is received from the bypass optical transceiver 104b.

The control terminal 114 sets a wavelength of an optical signal to be detected by the wavelength selection optical intensity detector 113. A wavelength of the optical signal is set, for example, to a wavelength for OSNR measurement (wavelength λk for measurement).

[Operation]

Next, an operation of a communication system configured as described above is described.

First of all, the control terminal 114 sets a receiving wavelength of the bypass optical transceiver 104a in the transmitting side communication system 101 to a wavelength (for example, λk) for OSNR measurement by transmitting a control signal. The control terminal 114 also sets a transmitting wavelength of the bypass optical transceiver 104a to a bypass wavelength (λd).

Likewise, the control terminal 114 sets a receiving wavelength of the bypass optical transceiver 104b in the receiving side communication system 102 to a bypass wavelength (λd) by transmitting a control signal. The control terminal 114 also sets a transmitting wavelength of the bypass optical transceiver 104b to a wavelength (λk) for OSNR measurement.

The bypass optical transceiver 104 on a transmitting side receives only a signal for OSNR measurement, of which wavelength is the same as a receiving wavelength (λk) being set according to the setting, among a wavelength multiplexed signal output from the optical coupler 107a (optical coupler A). The bypass optical transceiver 104a converts a wavelength of the signal into a bypass wavelength (λd), and outputs the bypass signal to the wavelength selection switch 108a.

Further, the bypass optical transceiver 104b on a receiving side receives only a signal, a of which wavelength is set to the bypass wavelength (λd), among a wavelength multiplexed signal from the optical coupler 107b (optical coupler C). The bypass optical transceiver 104b restores a wavelength of the signal to the wavelength (λk) for OSNR measurement.

The control terminal 114 sets a wavelength of a signal to be transmitted through the wavelength selection switch 108a on a transmitting side by transmitting a control signal. The wavelength selection switch 108a on a transmitting side blocks only a signal of a wavelength (λk) for OSNR measurement, among the wavelength multiplexed signal received from the optical coupler 107a (optical coupler A) according to the setting. Further, the wavelength selection switch 108a transmits the bypass signal (signal of the bypass wavelength λd), which is received from the bypass optical transceiver 104a. This allows the wavelength selection switch 108a to transmit the wavelength multiplexed signal to a transmission path in a state that a signal is not present in a wavelength for OSNR measurement (FIG. 4).

In the receiving side communication system 102, the control terminal 114 sets a wavelength of a signal to be transmitted through the wavelength selection switch 108b. The wavelength selection switch 108b on the receiving side blocks a signal of the bypass wavelength (λd), among the wavelength multiplexed signal received from the optical coupler 107b (optical coupler C), and transmits a signal other than the signal of the bypass wavelength (λd) according to the setting. Further, the wavelength selection switch 108b transmits a signal (signal of a wavelength λk for measurement), which is output from the bypass optical transceiver 104b according to the setting. The wavelength selection switch 108b multiplexes these signals to be transmitted, and outputs a multiplexed signal to the optical demultiplexer 112 at a later stage (FIG. 5). This allows each of the optical transceivers 103b to receive an original signal.

Further, as described above, the control terminal 114 sets a wavelength to be detected by the wavelength selection optical intensity detector 113. To measure OSNR, the wavelength selection optical intensity detector 113 on a receiving side measures a signal level at a point of time when a signal of a wavelength (λk) for measurement is present. The wavelength selection optical intensity detector 113 may measure a signal level of a signal of a wavelength for measurement in advance before the signal is bypassed. The wavelength selection optical intensity detector 113 measures a noise level at a point of time when the bypass wavelength (λk) is brought to a no signal state by converting a signal of the wavelength λk for measurement into the bypass signal (λd).

In summary, the wavelength selection optical intensity detector 113 measures a signal level of a signal (wavelength λk for measurement) at a timing when the signal is present in a wavelength (λk) for OSNR measurement. In this case, the control terminal 114 may control the wavelength selection optical intensity detector 113 to measure a signal level.

The control terminal 114 sets transmitting wavelengths and receiving wavelengths of the bypass optical transceivers (104a and 104b), and wavelengths of signals to be transmitted through the wavelength selection switches (108a and 108b) respectively with respect to the bypass optical transceivers and the wavelength selection switches.

The bypass optical transceiver 104a outputs a signal of a wavelength (λk) for measurement, among a wavelength multiplexed signal output from the optical coupler 107a (optical coupler A) by conversion into the bypass wavelength (λd) according to the setting. The wavelength selection switch 108a multiplexes a signal other than a wavelength (λk) for measurement, out of the wavelength multiplexed signal output from the optical coupler 107a (optical coupler A), and a bypass signal (bypass wavelength λd) output from the bypass optical transceiver 104a, and transmits a multiplexed signal to a transmission path.

The wavelength selection optical intensity detector 113 on a receiving side measures a noise level of a wavelength (λk) for OSNR measurement, among a wavelength multiplexed signal received from the optical coupler 107b (optical coupler B).

The bypass optical transceiver 104b on a receiving side converts a signal of the bypass wavelength λd into a signal of a wavelength λk for measurement, among a wavelength multiplexed signal output from the optical coupler 107b (optical coupler C). The wavelength selection switch 108b multiplexes a signal other than the bypass wavelength (λd), among the wavelength multiplexed signal output from the optical coupler 107b (optical coupler C), and a signal of a wavelength λk for measurement, which is output from the bypass optical transceiver 104b, and transmits a multiplexed signal to the optical demultiplexer 112.

By sequentially performing the aforementioned operations with respect to all bands of a wavelength multiplexed signal included in a main signal, for example, from a channel 1 (wavelength λ1) to a channel n (wavelength λn), it is possible to measure an OSNR in all bands.

A switching time of the wavelength selection switches (108a and 108b) is about several ten microseconds per channel. Therefore, continuous traffic disconnection (blocked state) may not be caused by the switching. Therefore, in a communication system in the present example embodiment (the transmitting side communication system 101 and the receiving side communication system 102), it is possible to measure an OSNR in an actual operational state without generating a state of continuous traffic disconnection. Further, as far as a communication capacity of a bypass wavelength (λd) and a communication capacity of an original wavelength (λk) for measurement are substantially the same, it is possible to prevent or alleviate reduction of a communication speed (communication band) accompanied by OSNR measurement.

As described above, according to a communication system in the present example embodiment, in an optical communication system using a wavelength multiplexed signal, it is possible to measure an optical signal to noise ratio, while reducing an influence on a communication environment. More specifically, according to a communication system in the present example embodiment, it is possible to measure a true OSNR in a real environment, which is affected by cable repair or aging deterioration in operation, while minimizing a traffic disconnection time.

Second Example Embodiment

Next, the second example embodiment of the present invention is described. Note that overlapping description on the same configuration as the configuration of the first example embodiment is omitted by indicating the same reference numerals.

Figure 7:
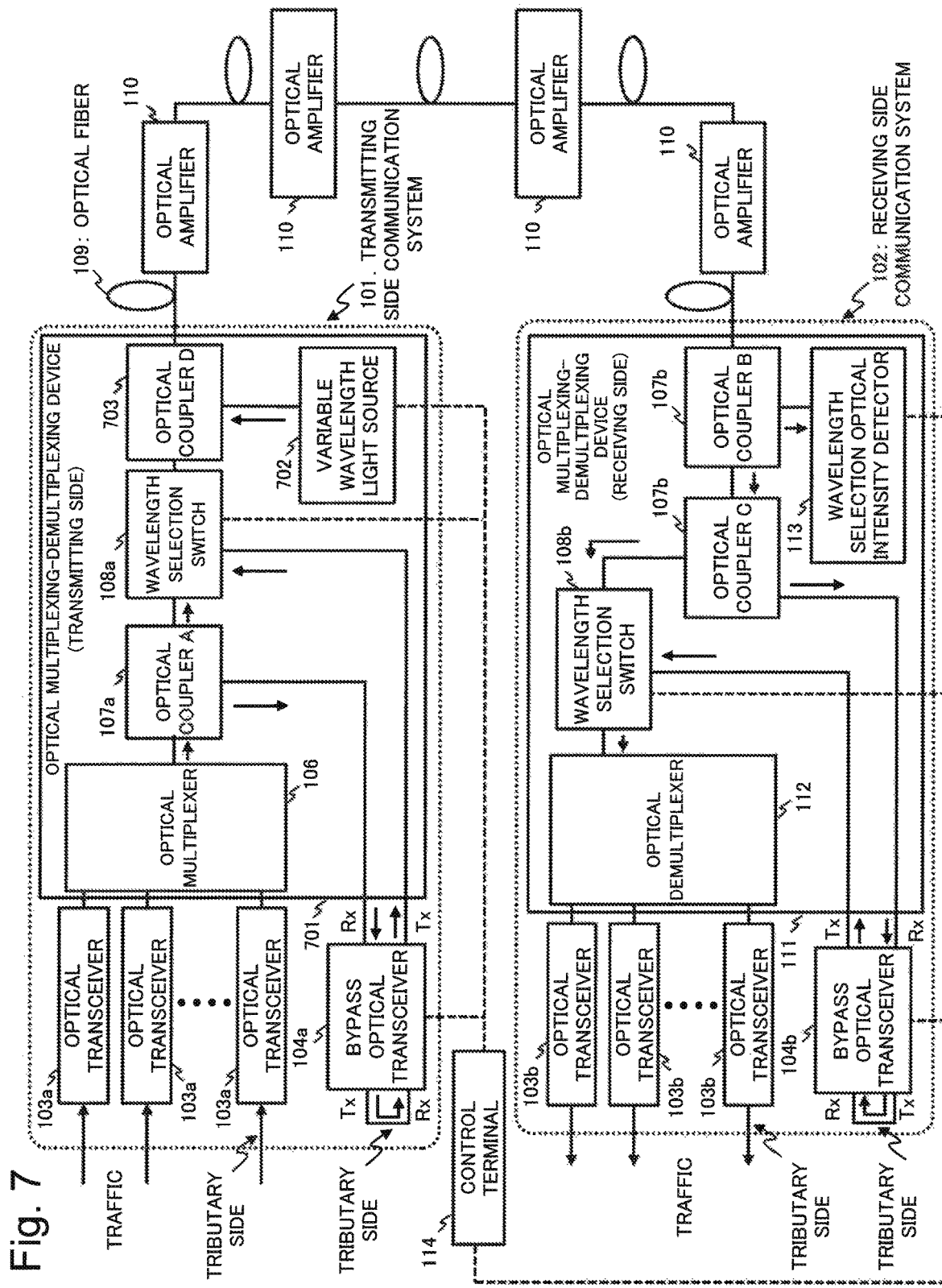
FIG. 7 is a block diagram exemplifying a functional configuration of constituent elements constituting a communication system in the second example embodiment of the present invention.

FIG. 7 is a block diagram exemplifying a functional configuration of a communication system in the present example embodiment. In the present example embodiment, an optical multiplexing-demultiplexing device 701 on a transmitting side is different from the optical multiplexing-demultiplexing device in the first example embodiment, and the other configuration of the present example embodiment is the same as the first example embodiment.

Figure 6:
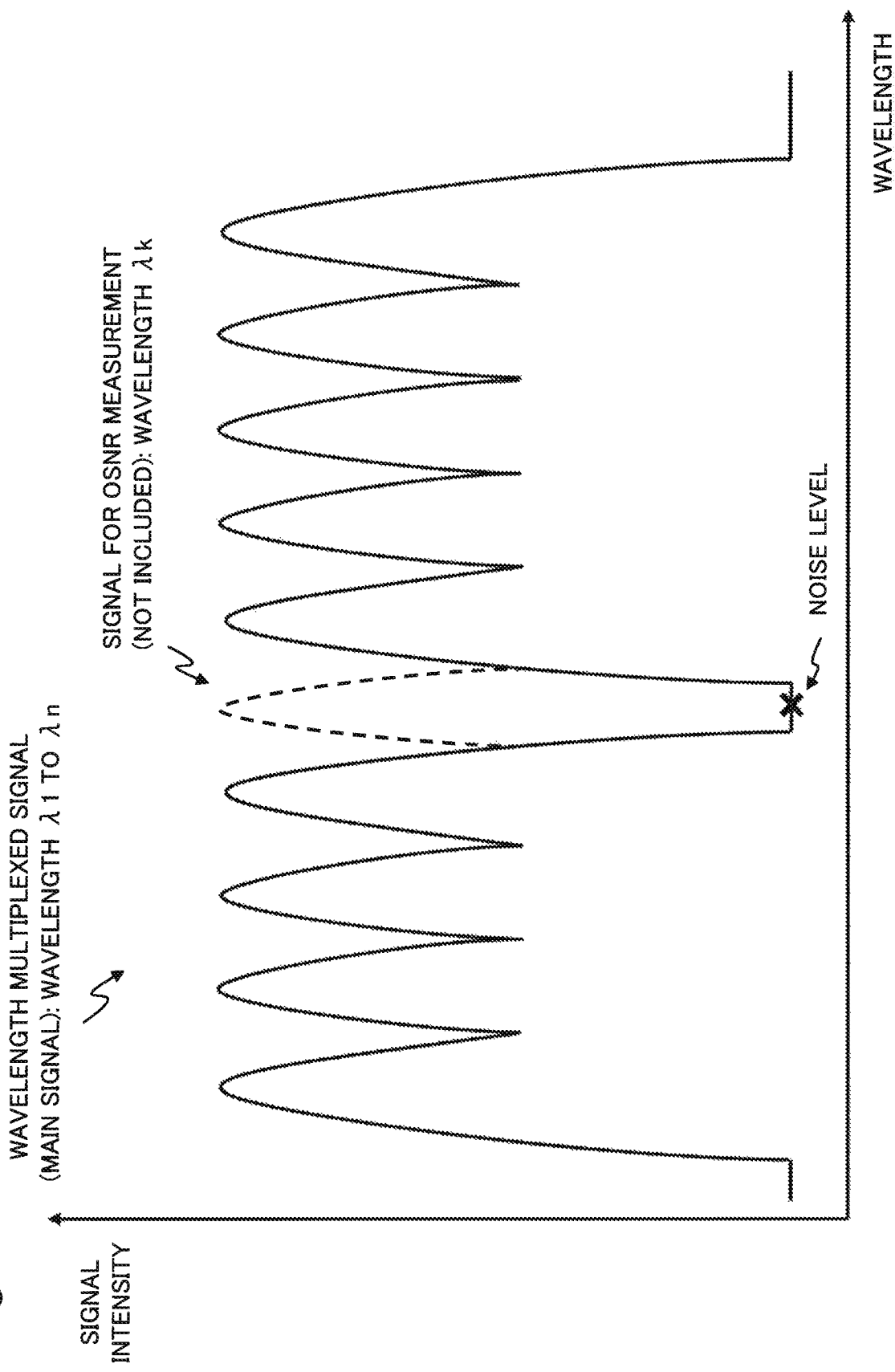
FIG. 6 is an explanatory diagram schematically illustrating a wavelength multiplexed signal when a signal of a specific wavelength is not included in association with a second example embodiment of the present invention.

For example, in an initial operational state of a system, a part of signals may not be implemented in a signal band of a main signal. As a concrete example, as illustrated in FIG. 6, it is assumed a case where a signal band of a main signal includes "n" wavelengths from a wavelength λ1 to a wavelength λn, and a signal of λk, which is a wavelength for OSNR measurement, is not implemented (for example, traffic data are not modulated). In this case, it is necessary to transmit and receive a certain signal by superimposing the signal on a wavelength λk for measurement in order to measure an OSNR. In view of the above, in the present example embodiment, the optical multiplexing-demultiplexing device 701 generates a signal of a wavelength λk for measurement.

As exemplified in FIG. 7, the optical multiplexing-demultiplexing device 701 in a transmitting side communication system 101 further includes an optical coupler 703 (optical coupler D) and a variable wavelength light source 702 with respect to the optical multiplexing-demultiplexing device 105 in the first example embodiment. A configuration other than the configuration of the optical multiplexing-demultiplexing device 701 may be the same as the configuration of the optical multiplexing-demultiplexing device 105 in the first example embodiment.

The variable wavelength light source 702 is a light source capable of emitting light of a specific wavelength, based on setting, a control signal, or the like. The variable wavelength light source 702 is connected to a control terminal 114, and emits light of a wavelength (λd) for measurement, based on a control signal from the control terminal 114.

The optical coupler 703 (optical coupler D) multiplexes a wavelength multiplexed signal to be output from a wavelength selection switch 108a, and output light to be output from the variable wavelength light source 702, and transmits a multiplexed signal to a transmission path. The optical coupler 703 functions as an optical multiplexer. The optical coupler 703 may be implemented, for example, by using an interference film filter using a dielectric multilayer film, a diffraction grating, or the like.

Figure 8:
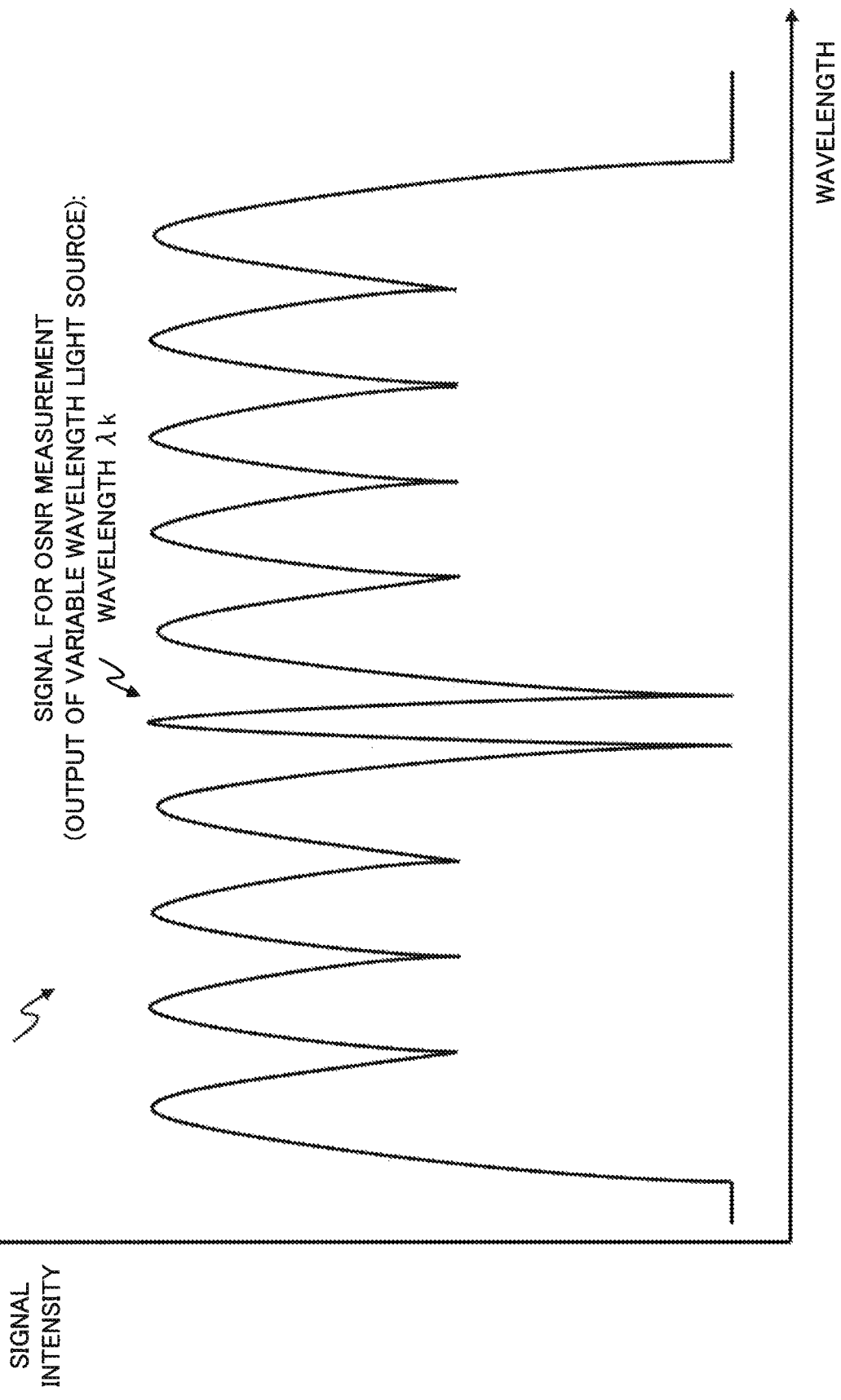
FIG. 8 is an explanatory diagram schematically illustrating a wavelength multiplexed signal when a signal is inserted in a wavelength for OSNR measurement in the second example embodiment of the present invention.

The optical multiplexing-demultiplexing device 701 configured as described above inserts an output of the variable wavelength light source 702 in order to measure a signal level, when a signal is not present in a wavelength (λk) for OSNR measurement (FIG. 8).

A wavelength selection optical intensity detector 113 on a receiving side measures a noise level at a timing when a wavelength (λk) for OSNR measurement is in a no signal state in the same manner as the first example embodiment. The wavelength selection optical intensity detector 113 also measures a signal level when an output of the variable wavelength light source 702 is transmitted as a signal of a wavelength (λk) for OSNR measurement. This allows a communication system in the present example embodiment to measure an OSNR of a wavelength (λk) for measurement in a transmission path. Note that in this case, it is not necessary for the transmitting side communication system 101 in the present example embodiment to execute processing of bypassing and transmitting a signal of a wavelength for measurement, which is described in the first example embodiment, since a signal for transmitting traffic data is not present in a wavelength (λk) for measurement from the beginning.

According to a communication system in the present example embodiment configured as described above, even when a signal is not implemented in a wavelength for measurement, it is possible to measure an OSNR in a transmission path in an actual operational state. This is because the optical multiplexing-demultiplexing device 701 is able to generate a signal of a wavelength for measurement by using the variable wavelength light source 702. Further, a communication system in the present example embodiment is able to measure an OSNR in an actual operational state without generating continuous traffic disconnection, since a signal for transmitting traffic data is not present. Thus, according to a communication system in the present example embodiment, it is possible to measure an optical signal to noise ratio, while reducing an influence on a communication environment in an optical communication system using a wavelength multiplexed signal.

Modified Example of Second Example Embodiment

Next, a Modified Example of the second example embodiment is described. A communication system (a transmitting side communication system 101 and a receiving side communication system 102) in the present Modified Example may have the same configuration as the first example embodiment and the second example embodiment.

Also in the present Modified Example, as well as the second example embodiment, it is assumed a case where a part of signals is not implemented in a signal band of a main signal. Specifically, as exemplified in FIG. 6, it is assumed a case where a signal band of a main signal includes "n" wavelengths from a wavelength λ1 to a wavelength λn, and λk, which is a wavelength for OSNR measurement, is not implemented (a signal is not present). In this case, it is necessary to transmit and receive a certain signal which is superimposed on a wavelength λk for measurement in order to measure an OSNR.

In view of the above, in the present Modified Example, a control terminal 114 sets a receiving wavelength of a bypass optical transceiver 104a on a transmitting side to a specific wavelength λm, and sets a transmitting wavelength of the bypass optical transceiver 104a to a wavelength λk for measurement. In this case, the bypass optical transceiver 104a receives a signal of a wavelength λm, converts the signal of the wavelength λm into a signal of a wavelength λk for measurement, and outputs the signal of the wavelength λk for measurement. λm is any wavelength included in a signal band (λ1 to λn) of a main signal, and in which a signal for transmitting traffic data is included (signal is present).

In the present Modified Example, the control terminal 114 sets a receiving wavelength of a bypass optical transceiver 104b on a receiving side to λk, and sets a transmitting wavelength of the bypass optical transceiver 104b to a wavelength λm. In this case, the bypass optical transceiver 104b receives a signal of a wavelength λk for measurement, and outputs a signal by conversion into a signal of a wavelength λm.

Figure 9:
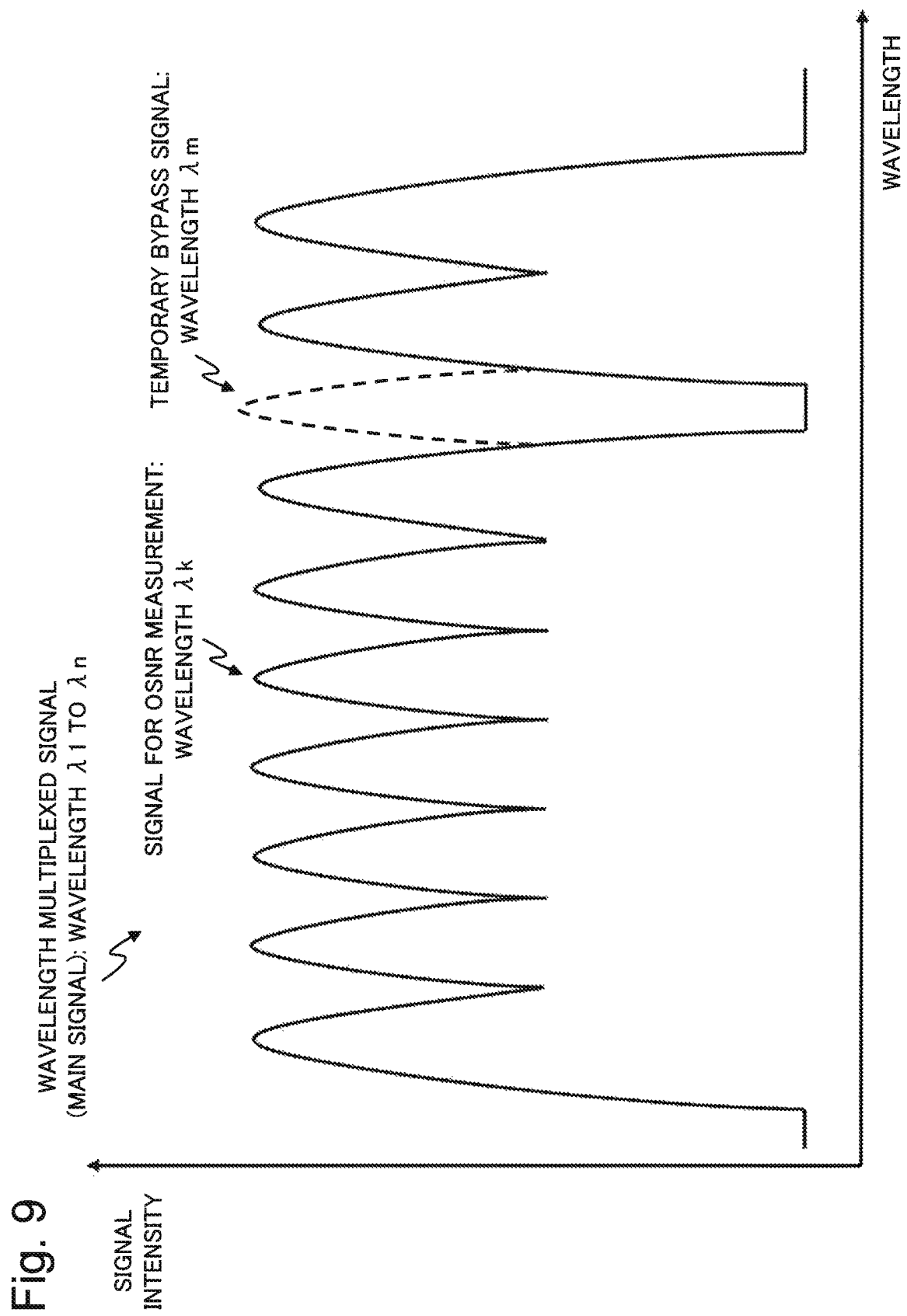
FIG. 9 is an explanatory diagram schematically illustrating a wavelength multiplexed signal when a signal of another wavelength is temporarily inserted as a signal of a wavelength for OSNR measurement in a Modified Example of the second example embodiment of the present invention.

Specifically, in the present Modified Example, as exemplified in FIG. 9, a signal of a wavelength λm which is already implemented is temporarily converted into a signal of a wavelength λk for OSNR measurement in which a signal is not present. This allows optical multiplexing-demultiplexing devices (105 and 701) on a transmitting side to generate a signal of a wavelength λk for OSNR measurement. Note that the bypass optical transceiver 104b on a receiving side is able to restore (convert) a signal of a wavelength (λk) for measurement to a signal of an original wavelength λm by executing the same processing as in the first example embodiment.

Thus, a communication system in the present Modified Example is able to measure an OSNR in a transmission path in an actual operational state even when a signal is not included in a wavelength for measurement. Note that the present Modified Example is applicable when the number of signals which are not included is small.

Third Example Embodiment

Figure 10:
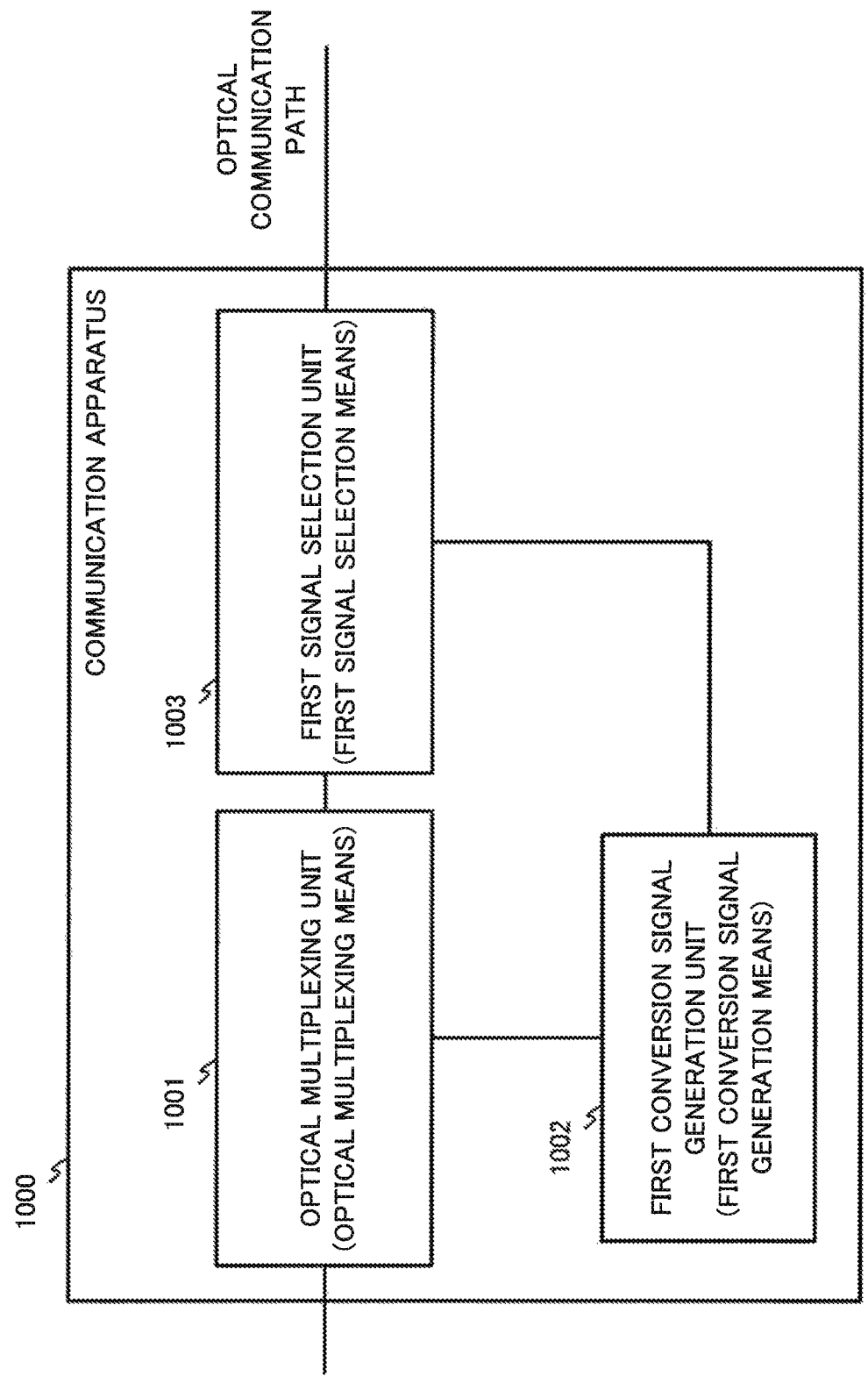
FIG. 10 is a block diagram exemplifying a functional configuration of a communication apparatus according to a third example embodiment of the present invention.

Next, the third example embodiment of the present invention is described. FIG. 10 is a block diagram exemplifying a functional configuration of a communication apparatus according to the third example embodiment of the present invention.

A communication apparatus 1000 in the present invention includes, as exemplified in FIG. 10, an optical multiplexing unit (optical multiplexing means) 1001, a first conversion signal generation unit (first conversion signal generation means) 1002, and a first signal selection unit (first signal selection means) 1003. In the present example embodiment, these constituent elements are communicatively connected by any communicating means. The communicating means may specifically be a communication path constituted by using an optical communication apparatus. In the following, each of the constituent elements of the communication apparatus 1000 is described.

The optical multiplexing unit 1001 receives one or more optical signals, and generates a wavelength multiplexed signal that is an optical signal obtained by multiplexing the one or more optical signals. The optical multiplexing unit 1001 may be implemented, for example, by using the optical multiplexer 106 in the first example embodiment and in the first example embodiment.

The first conversion signal generation unit 1002 receives a wavelength multiplexed signal generated by the optical multiplexing unit 1001. Further, the first conversion signal generation unit 1002 generates a conversion signal that is an optical signal, which is converted into a signal of a second wavelength, by selecting a signal of a first wavelength from the wavelength multiplexed signal. The first conversion signal generation unit 1002 may be implemented, for example, by using the optical coupler 107a and the bypass optical transceiver 104a in the first example embodiment or in the second example embodiment. Further, the signal of the first wavelength may be, for example, a signal of a wavelength for measurement in each of the example embodiments. Further, the signal of the second wavelength may be, for example, a signal of a bypass wavelength in each of the example embodiments.

The first signal selection unit 1003 receives a wavelength multiplexed signal generated by the optical multiplexing unit 1001, and a conversion signal generated by the first conversion signal generation unit 1002. The first signal selection unit 1003 selects and outputs at least one of a signal included in a wavelength multiplexed signal, and a conversion signal, for each wavelength of a signal. The first signal selection unit 1003 may select, for example, a signal other than a signal of a first wavelength, out of a signal included in a wavelength multiplexed signal, and a conversion signal; and may output the selected signals to an optical communication path. The first signal selection unit 1003 may be implemented, for example, by using the wavelength selection switch 108a in the first example embodiment or in the second example embodiment.

The communication apparatus 1000 in the present example embodiment configured as described above is able to convert a signal of a first wavelength into a signal of a second wavelength, and transmit the converted signal to an optical communication transmission path. Specifically, the communication apparatus 1000 is able to convert a signal of a wavelength for OSNR measurement (signal of a first wavelength) into a bypass signal (signal of a second wavelength), and transmit the converted signal to an optical communication transmission path, for example. The communication apparatus 1000 prevents continuation of traffic disconnection relating to a signal of a wavelength for measurement by bypassing and transmitting a signal of a wavelength for measurement. This makes it possible to measure an OSNR relating to a wavelength for measurement without generating continuous traffic disconnection relating to a signal of a wavelength for measurement. Thus, according to the communication apparatus 1000 in the present example embodiment, it is possible to measure an optical signal to noise ratio, while reducing an influence on a communication environment in an optical communication system using a wavelength multiplexed signal.

Note that the communication apparatus 1000 in the present example embodiment configured as described above is able to implement, for example, the transmitting side communication system 101 in each of the first and second example embodiments.

Fourth Example Embodiment

Figure 11:
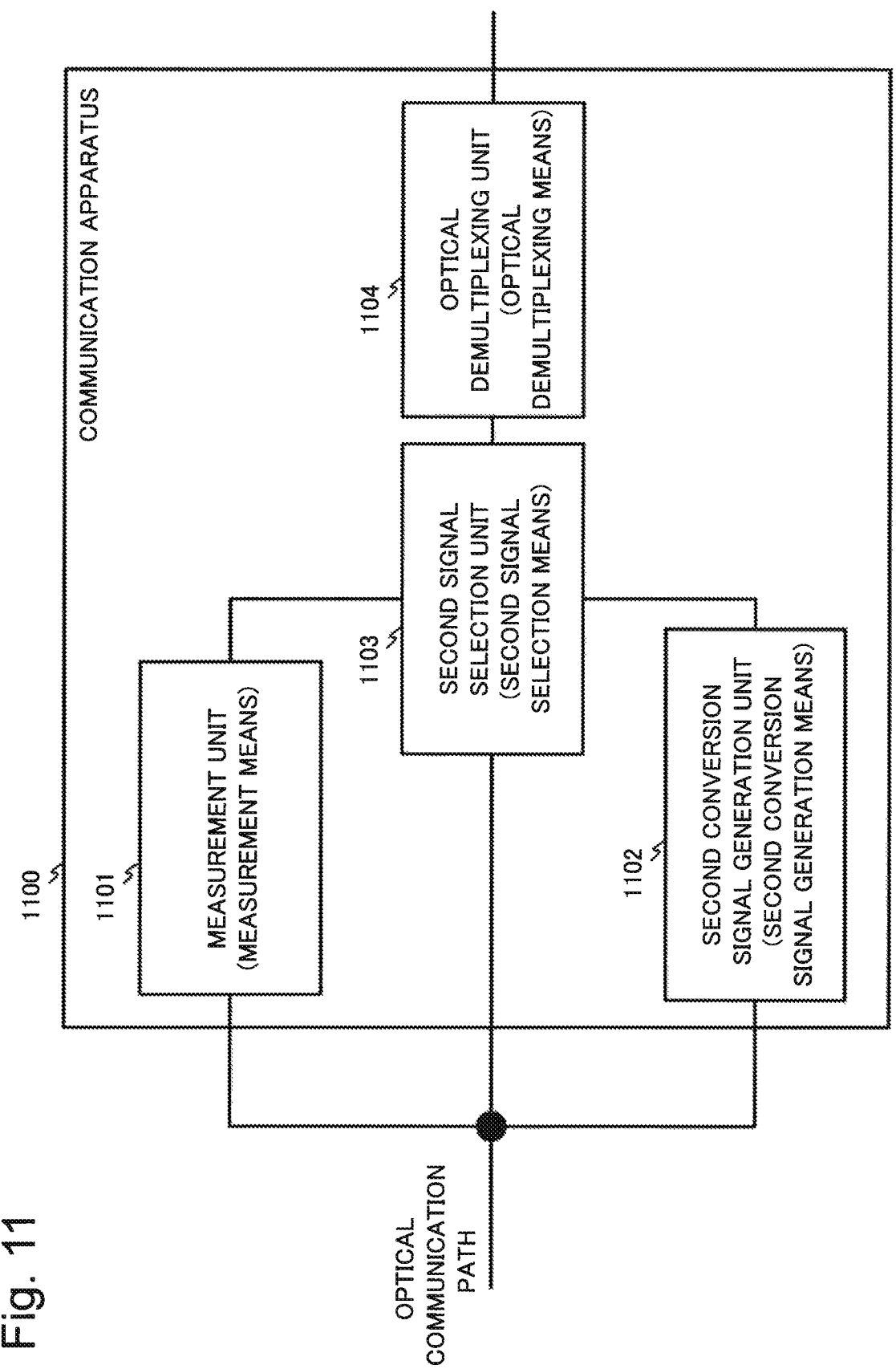
FIG. 11 is a block diagram exemplifying a functional configuration of a communication apparatus according to a fourth example embodiment of the present invention.

Next, the fourth example embodiment of the present invention is described. FIG. 11 is a block diagram exemplifying a functional configuration of a communication apparatus 1100 according to the fourth example embodiment of the present invention. A communication apparatus in the present example embodiment includes a measurement unit (measurement means) 1101, a second conversion signal generation unit (second conversion signal generation means) 1102, a second signal selection unit (second signal selection means) 1103, and an optical demultiplexing unit (optical demultiplexing means) 1104. In the present example embodiment, these constituent elements are communicatively connected by any communicating means. The communicating means may specifically be a communication path constituted by using an optical communication apparatus. In the following, each of the constituent elements of the communication apparatus 1100 is described.

The measurement unit 1101 receives, from an optical communication path, a wavelength multiplexed signal obtained by multiplexing one or more optical signals. Further, the measurement unit 1101 measures at least one of a signal level and a noise level relating to a third wavelength, out of the wavelength multiplexed signal. The measurement unit 1101 may be implemented, for example, by using the wavelength selection optical intensity detector 113 in the first and second example embodiments. Further, the third wavelength may be a wavelength for measurement in the first and second example embodiments.

The second conversion signal generation unit 1102 generates a restored signal that is an optical signal, a wavelength of which is converted into a third wavelength by selecting a signal of a fourth wavelength from the wavelength multiplexed signal. The second conversion signal generation unit 1102 may be implemented, for example, by using the optical coupler 107b and the bypass optical transceiver 104b in the first and second example embodiments. Further, the fourth wavelength may be a bypass wavelength in the first and second example embodiments.

The second signal selection unit 1103 receives the wavelength multiplexed signal and a restored signal, and selects at least one of an optical signal included in a wavelength multiplexed signal, and a restored signal, for each wavelength of an optical signal included in the wavelength multiplexed signal and the restored signal. The second signal selection unit 1103 may, for example, select a signal other than a signal of a fourth wavelength out of the wavelength multiplexed signal, and the restored signal (signal a wavelength of which is converted into a third wavelength), and may output the selected signals to the optical demultiplexing unit 1104 (to be described later). The second signal selection unit 1103 may be implemented, for example, by using the wavelength selection switch 108b in the first and second example embodiments.

The optical demultiplexing unit 1104 demultiplexes an optical signal selected by the second signal selection unit 1103, based on a wavelength of a signal included in the optical signal. The optical demultiplexing unit 1104 may be implemented by using the optical demultiplexer 112 in the first and second example embodiments.

The communication apparatus 1100 in the present example embodiment configured as described above is able to measure a signal level of a signal when the signal is present in a third wavelength, and is able to measure a noise level of a signal when the signal is not present in a third wavelength, for example. Specifically, the communication apparatus 1100 in the present example embodiment is able to measure an OSNR relating to a third wavelength.

For example, it is assumed that a signal of a fourth wavelength is a bypass signal in the first and second example embodiments, and a signal of a third wavelength is a signal of a wavelength for measurement in the first and second example embodiments. In this case, the communication apparatus 1100 is able to convert a signal of a bypass wavelength (fourth wavelength) into a signal of a wavelength for measurement (third wavelength), out of a wavelength multiplexed signal received from an optical communication path. The communication apparatus 1100 is able to select a signal of a wavelength other than a bypass wavelength, which is included in a wavelength multiplexed signal, and the aforementioned converted signal for measurement, demultiplex the selected signals for each frequency, and output the demultiplexed signals.

Thus, for example, when a signal of a wavelength for measurement is converted into a signal of a bypass wavelength, and the converted signal of the bypass wavelength is transmitted in order to avoid a state of continuous traffic disconnection, the communication apparatus 1100 is able to restore the transmitted signal of the bypass wavelength to an original signal (signal of a wavelength for measurement).

Thus, according to a communication apparatus in the present example embodiment, in an optical communication system using a wavelength multiplexed signal, it is possible to measure an optical signal to noise ratio, while reducing an influence on a communication environment.

Note that the communication apparatus 1100 in the present example embodiment configured as described above is able to implement, for example, the receiving side communication system 102 in each of the first and second example embodiments.

Modified Example of Fourth Example Embodiment

Figure 12:
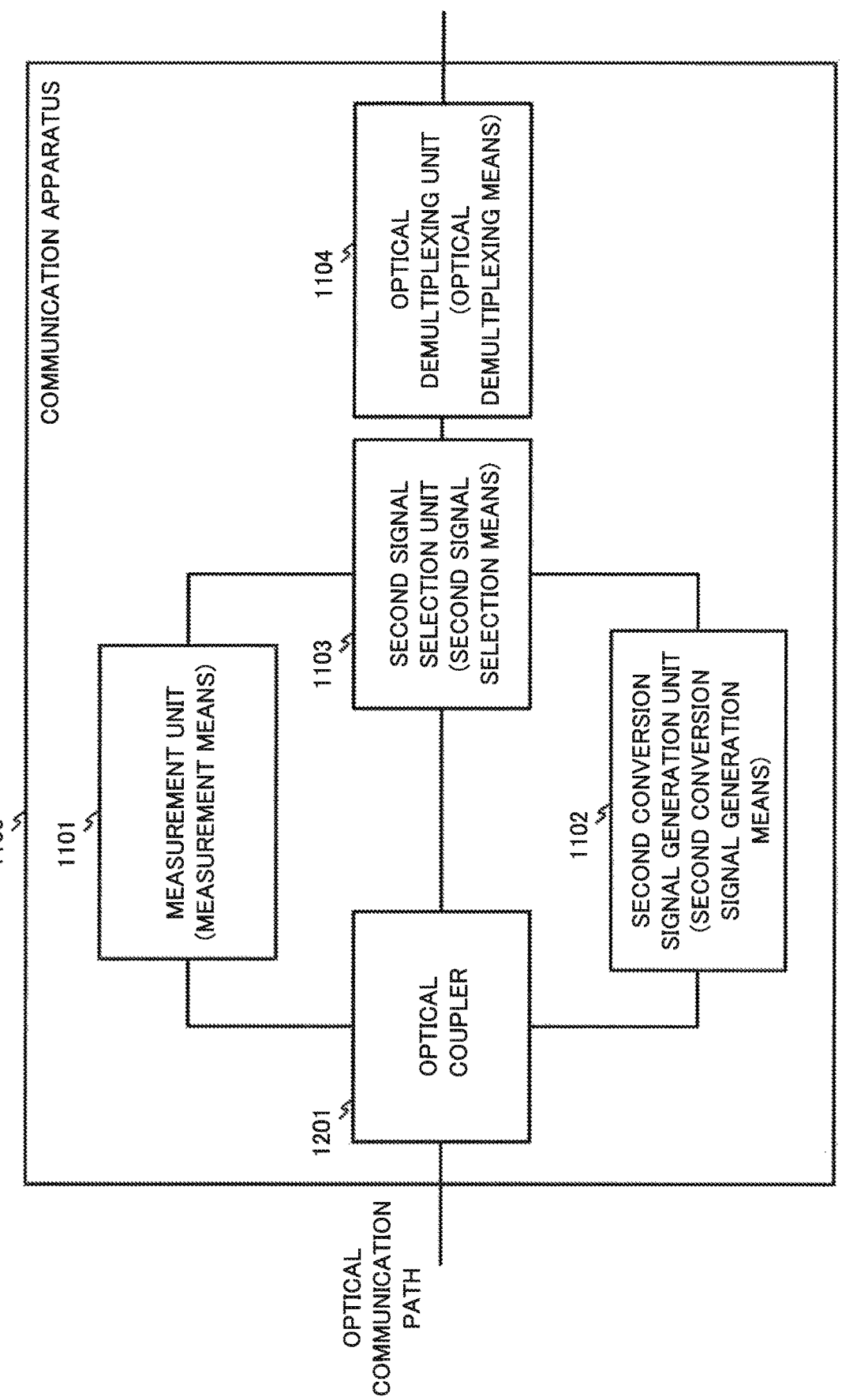
FIG. 12 is a block diagram exemplifying a functional configuration of a communication apparatus according to a Modified Example of the fourth example embodiment of the present invention.

As a Modified Example of the fourth example embodiment, as exemplified in FIG. 12, a communication apparatus 1100 may include an optical coupler 1201. The optical coupler 1201 distributes a wavelength multiplexed signal transmitted from an optical communication path to a measurement unit 1101, a second conversion signal generation unit 1102, and a second signal selection unit 1103. The optical coupler 1201 may be implemented, for example, by using the optical coupler 107b in the first and second example embodiments.

Note that the other configuration in the present Modified Example may be the same as the fourth example embodiment.

Fifth Example Embodiment

Figure 13:
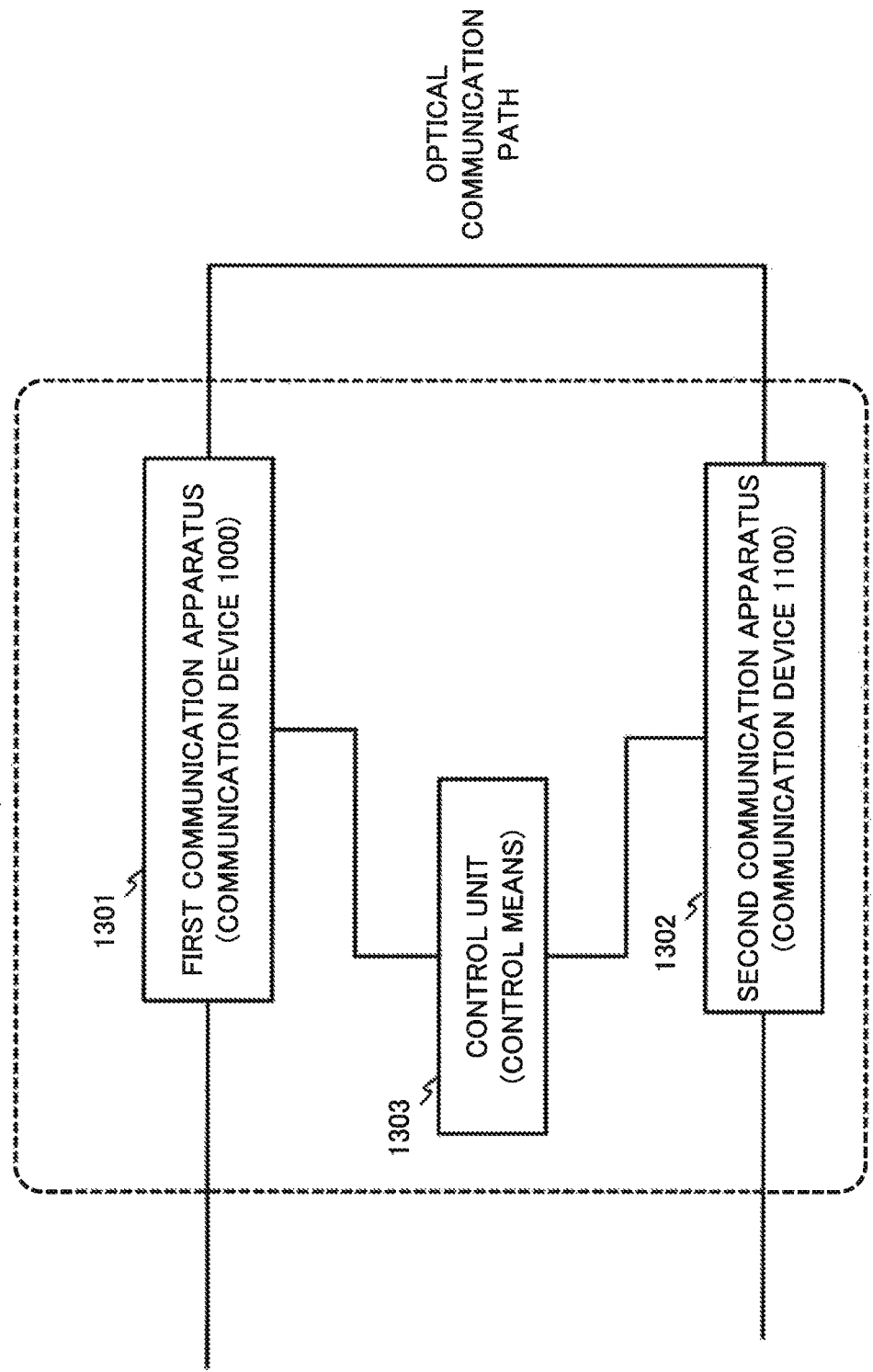
FIG. 13 is a block diagram exemplifying a functional configuration of a communication apparatus according to a fifth example embodiment of the present invention.

Next, the fifth example embodiment of the present invention is described. FIG. 13 is a block diagram exemplifying a functional configuration of a communication system 1300 in the present example embodiment. As exemplified in FIG. 13, the communication system 1300 includes a first communication apparatus 1301, a second communication apparatus 1302, and a control unit (control means) 1303. The control unit 1303 and the first communication apparatus 1301 are communicatively connected by any communicating means. Likewise, the control unit 1303 and the second communication apparatus 1302 are communicatively connected by any communicating means. Further, the first communication apparatus 1301 and the second communication apparatus 1302 are communicatively connected by an optical communication path.

The first communication apparatus 1301 may be the same as the communication apparatus 1000 in the third example embodiment.

The second communication apparatus 1302 may be the same as the communication apparatus 1100 in the fourth example embodiment.

The control unit 1303 notifies the first communication apparatus 1301 of at least one of the first wavelength and the second wavelength, and a signal to be selected from a signal included in the wavelength multiplexed signal and the conversion signal. The control unit 1303 may transmit the aforementioned notification to the first communication apparatus 1301, for example, by using a control signal.

Further, the control unit 1303 notifies the second communication apparatus of at least one of the third wavelength equal to the first wavelength, and the fourth wavelength equal to the second wavelength. Further, the control unit 1303 notifies the second communication apparatus of a signal to be selected from a signal included in the wavelength multiplexed signal received from the optical communication path and the restored signal.

Further, the control unit 1303 designates the measurement unit in the second communication apparatus to measure a noise level relating to the third wavelength at a timing when a signal is present in the third wavelength. Further, the control unit 1303 designates the measurement unit in the second communication apparatus to measure a signal level relating to the third wavelength at a timing when a signal is not present in the third wavelength.

The control unit 1303 may, for example, be the same as the control terminal 114 in the first and second example embodiments.

According to the communication system 1300 configured as described above, for example, a wavelength for measurement (first and third wavelengths) and a bypass wavelength (second and fourth wavelengths) in each of the communication apparatus (1301 and 1302) are set, based on notification from the control unit 1303. Likewise, a signal included in an optical signal to be transmitted to an optical communication path by the first communication apparatus 1301 is selected, based on notification from the control unit 1303. Further, a signal to be selected by the second communication apparatus 1302 is selected, based on notification from the control unit 1303. Furthermore, a noise level and a signal level relating to a wavelength for OSNR measurement are measured by the second communication apparatus 1302.

Thus, according to the communication system 1300 in the present example embodiment, it is possible to measure an OSNR relating to a specific wavelength (first and third wavelengths). Further, according to the communication system 1300, a signal of a wavelength for OSNR measurement is converted into a signal (bypass signal) of another wavelength (second and fourth wavelengths), and the converted signal is transmitted from the first communication apparatus 1301 to the second communication apparatus 1302. Specifically, it is possible to bypass and transmit a signal of a wavelength for measurement by using the first communication apparatus 1301 and the second communication apparatus 1302. Therefore, the communication system 1300 is able to prevent generation of continuous traffic disconnection relating to a signal of a wavelength for measurement. Thus, for example, it is possible to measure an OSNR relating to a wavelength for measurement without generating continuous traffic disconnection relating to a signal of a wavelength for measurement. As described above, according to a communication system in the present example embodiment, in an optical communication system using a wavelength multiplexed signal, it is possible to measure an optical signal to noise ratio, while reducing an influence on a communication environment.

Note that the control terminal 114 and the control unit 1303 in the example embodiments may be implemented, for example, by using a hardware and a software program as described below. In the following description, the control terminal 114 and the control unit 1303 described in the example embodiments are simply referred to as a "control unit".

A control unit described in the example embodiments may be implemented by using one or a plurality of dedicated hardware devices (for example, an integrated circuit in which processing logic is implemented, a storage device, or the like).

For example, when the control unit is implemented by a dedicated hardware device, constituent elements of the control unit may be implemented by using an integrated circuit capable of providing functions of the respective constituent elements (for example, a System on a Chip (SoC) or the like). In this case, data to be held by constituent elements of the control unit may be configured in a Random Access Memory (RAM) area integrated as an SoC, or a flash memory area, for example.

Figure 14:
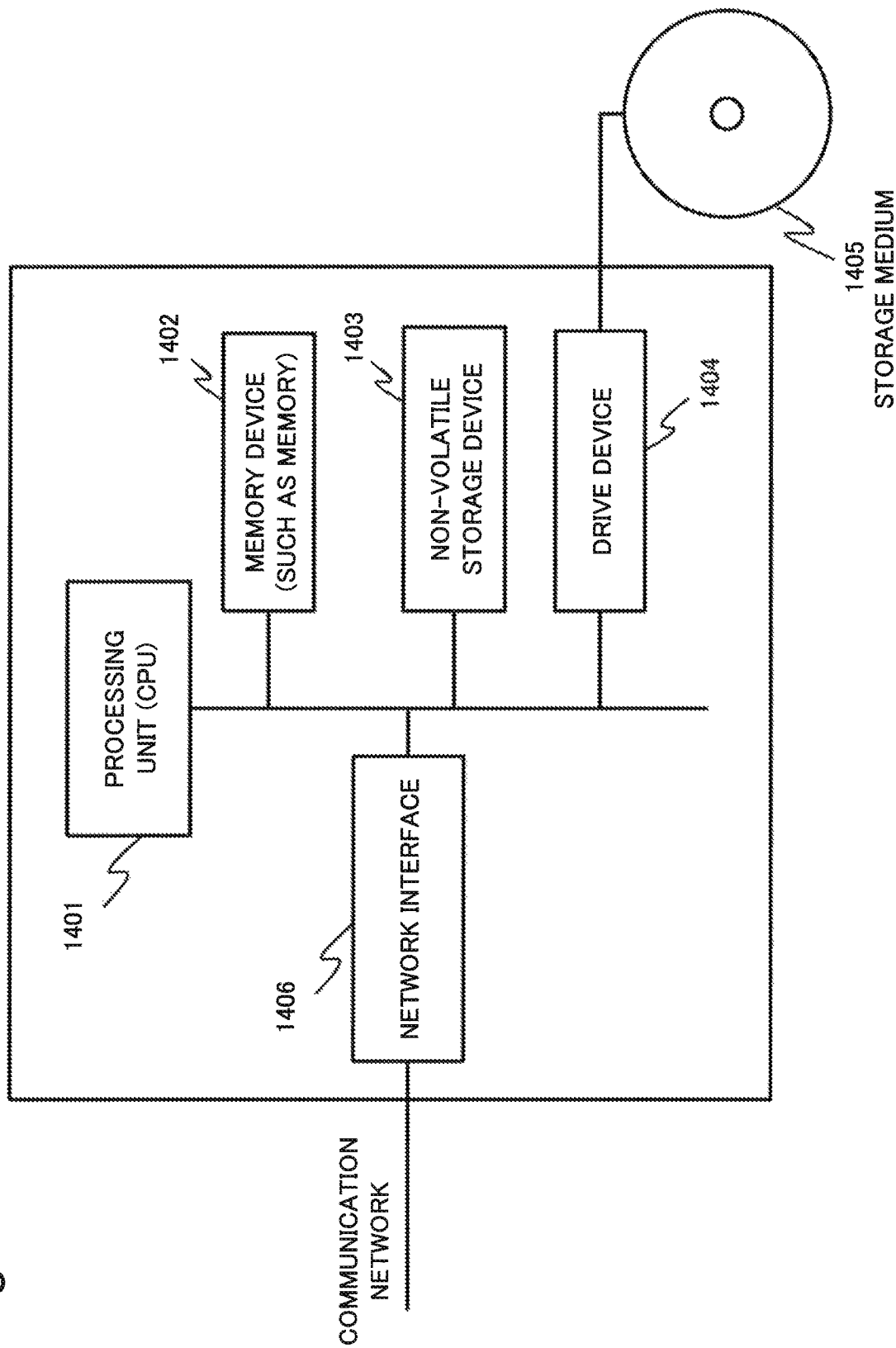
FIG. 14 is an explanatory diagram exemplifying a hardware configuration capable of implementing a control terminal or a control unit in each of the example embodiments of the present invention.

Further, the aforementioned control unit may be constituted by a general-purpose hardware as exemplified in FIG. 14, and various software programs (computer programs) to be executed by the hardware.

A processing unit 1401 in FIG. 8 is a processing unit such as a general-purpose Central Processing Unit (CPU), a microprocessor, or the like. The processing unit 1401 may, for example, read various software programs stored in a non-volatile storage device 1403 to be described later to a memory device 1402, and may execute processing according to the software programs. For example, constituent elements of the control unit in each of the example embodiments may be implemented as a software program which is executed by the processing unit 1401.

The memory device 1402 is a memory device referable from the processing unit 1401 such as an RAM, and stores a software program, various data, and the like. Note that the memory device 1402 may be a volatile memory device.

The non-volatile storage device 1403 is a non-volatile storage device, for example, as exemplified by a magnetic disk drive, or a semiconductor storage device by a flash memory. The non-volatile storage device 1403 is able to store various software programs, data, and the like.

A network interface 1406 is an interface device to be connected to a communication network. For example, an interface device to be connected to a wired telecommunications line and a wireless telecommunications line, an interface device to be connected to an optical communication line, and the like may be employed.

A drive device 1404 is a device for executing data reading and writing with respect to a storage medium 1405 to be described later, for example.

The storage medium 1405 is any storage medium capable of recording data, for example, such as an optical disc, a magneto-optical disk, a semiconductor flash memory, or the like.

A control unit in the present invention as exemplarily described in each of the example embodiments may be implemented, for example, by supplying a software program capable of implementing functions described in each of the example embodiments to a hardware device exemplified in FIG. 8. More specifically, for example, the present invention may be implemented by causing the processing unit 1401 to execute a software program supplied to the device.

Further, the aforementioned software program may be recorded in the storage medium 1405. In this case, the aforementioned software program may be configured to be stored in the non-volatile storage device 1403 via the drive device 1404 as necessary at shipment of the control unit or the like, at an operational stage, or the like.

Note that in the aforementioned case, a method for supplying various software programs to the hardware may employ a method for installing various software programs in the aforementioned device by using an appropriate jig at a production stage before shipment, at a maintenance stage after shipment, or the like. Further, a method for supplying various software programs may employ a general procedure available nowadays, as exemplified by a method for downloading from the outside via a communication line such as the Internet.

Further, in the aforementioned case, it can be regarded that the present invention is configured by a computer readable storage medium such that a code constituting the software program, or the code is recorded. In this case, the storage medium is not limited to a medium independently of a hardware device, and includes a storage medium in which a software program transmitted by various communication networks is downloaded and stored, or temporarily stored.

In the foregoing, the present invention is described as an example, in which the present invention is applied to the aforementioned exemplary example embodiments. The technical range of the present invention, however, is not limited to a range described in each of the example embodiments. It is clear that a person skilled in the art is able to add various modifications or improvements to the example embodiments. In this case, a new example embodiment in which the modification or improvement is added may also be included in the technical range of the present invention. Further, an exemplary embodiment, in which the aforementioned exemplary embodiments, or a new exemplary embodiment including the modification or improvement are combined may also be included in the technical range of the present invention. Further, this is clear from matters described in the claims.

This application claims the priority based on Japanese Patent Application No. 2015-130803 filed on Jun. 30, 2015, entire disclosure of which is hereby incorporated.

REFERENCE SIGNS LIST

101 Transmitting side communication system
102 Receiving side communication system
103 Optical transceiver
104 Bypass optical transceiver
105 Optical multiplexing-demultiplexing device
106 Optical multiplexer
107 Optical coupler
108 Wavelength selection switch
109 Optical fiber
110 Optical amplifier
111 Optical multiplexing-demultiplexing device
112 Optical demultiplexer
113 Wavelength selection optical intensity detector
114 Control terminal
701 Optical multiplexing-demultiplexing device
702 Variable wavelength light source
703 Optical coupler
1000 Communication apparatus
1001 Optical multiplexing unit
1002 First conversion signal generation unit
1003 First signal selection unit
1100 Communication apparatus
1101 Measurement unit
1102 Second conversion signal generation unit
1103 Second signal selection unit
1104 Optical demultiplexing unit
1201 Optical coupler
1300 Communication system
1301 First communication apparatus
1302 Second communication apparatus
1303 Control unit
1401 Processing unit
1402 Memory device
1403 Non-volatile storage device
1404 Drive device
1405 Storage medium
1406 Network interface

The invention claimed is:

1. A communication apparatus comprising:
an optical multiplexer that is configured to receive one or more optical signals for transmitting data, and generate a wavelength multiplexed signal that is an optical signal obtained by multiplexing the one or more optical signals;
a first conversion signal generator that is configured
to select a signal of a first wavelength from the wavelength multiplexed signal generated by the optical multiplexer, and
to generate a conversion signal by converting the signal of a first wavelength being selected into a signal of a second wavelength; and
a first signal selector that is configured
to receive the wavelength multiplexed signal generated and the conversion signal, and
to select and output at least one of a signal included in the wavelength multiplexed signal and the conversion signal, for each wavelength of a signal included in the wavelength multiplexed signal and the conversion signal,
wherein
the first conversion signal generator generates the conversion signal by converting the signal of the first wavelength into the signal of the second wavelength which is not included in a wavelength band in the wavelength multiplexed signal and is included in a wavelength band used for monitoring a transmission path.

2. The communication apparatus according to claim 1, wherein
the first signal selector selects and outputs the conversion signal and the wavelength multiplexed signal from which the signal of the first wavelength is removed.

3. The communication apparatus according to claim 1, further comprising:
a variable wavelength light source to generate an optical signal of a particular wavelength; and
an optical coupler to multiplex the wavelength multiplexed signal selected by the first signal selector, and an optical signal being output from the variable wavelength light source, wherein,
when the wavelength multiplexed signal includes a specific wavelength in which data to be transmitted are not modulated,
the variable wavelength light source generates a signal of a same wavelength as the specific wavelength, and
the first signal selector selects and outputs the wavelength multiplexed signal selected by the first signal selector, and a signal of the specific wavelength generated by the variable wavelength light source.

4. A communication apparatus comprising:
a measurement device that is configured
to receive, from an optical communication path, a wavelength multiplexed signal obtained by multiplexing one or more optical signals, and
to measure at least one of a noise level and a signal level of a signal of a third wavelength in the wavelength multiplexed signal;
a second conversion signal generator that is configured to generate a restored signal being an optical signal of a third wave length, by selecting a signal of a fourth wavelength from the wavelength multiplexed signal and converting the selected signal into the optical signal of the third wavelength;

a second signal selector that is configured to receive the wavelength multiplexed signal and the restored signal, and select at least one of the restored signal and an optical signal included in the wavelength multiplexed signal, for each wavelength of an optical signal included in the wavelength multiplexed signal and the restored signal; and an optical demultiplexer to demultiplex an optical signal selected by the second signal selector, based on a wavelength of a signal included in the optical signal.

5. The communication device according to claim 4, wherein the second signal selector selects the restored signal and the wavelength multiplexed signal from which the signal of the fourth wavelength is removed.

6. The communication device according to claim 4, wherein the measurement means measures a noise level regarding the optical signal of the third wavelength, at a timing when a signal is not present in the third wavelength, and measures, a signal level regarding the optical signal of the third wavelength, at a timing when a signal is present in the third wavelength.

7. A controller for optical network communication comprising:

processing circuitry; a memory storing instructions for the processing circuitry;

and a network communication interface, the communication interface being connected to:

a first communication apparatus including:

a first conversion signal generator that is configured to select a signal of a first wavelength from a wavelength multiplexed signal being received, and to generate a conversion signal by converting the signal of a first wavelength being selected into a signal of a second wavelength; and a first signal selector that is configured to output, as a converted wavelength multiplexed signal at least one of a signal included in the wavelength multiplexed signal and the conversion signal, for each wavelength of a signal included in the wavelength multiplexed signal and the conversion signal, and a second communication apparatus including:

a measurement device that is configured to receive, from an optical communication path, the converted wavelength multiplexed signal being output from the first communication apparatus, and to measure at least one of a noise level and a signal level of a signal of a third wavelength in the converted wavelength multiplexed signal received;

a second conversion signal generator that is configured to generate a restored signal being an optical signal of a third wave length, by selecting a signal of a fourth wavelength from the converted wavelength multiplexed signal and converting the selected signal into the optical signal of the third wavelength, the processing circuitry, by executing the instructions stored in the memory, being configured to:

notify the first communication apparatus of at least one of the first wavelength and the second wavelength, notify the second communication apparatus of at least one of the third wavelength that is equal to the first wavelength, and the fourth wavelength that is equal to the second wavelength, instruct the measurement device in the second communication apparatus to measure a noise level regarding the third wavelength at a timing when a signal is not present in the third wavelength, and instruct the measurement device in the second communication apparatus to measure a signal level relating to the third wavelength at a timing when a signal is present in the third wavelength.

* * * * *